United States Patent
Hu et al.

(10) Patent No.: US 11,178,323 B2
(45) Date of Patent: Nov. 16, 2021

(54) PHOTOSENSITIVE ELEMENT DRIVING MECHANISM

(71) Applicant: TDK TAIWAN CORP., Taoyuan (TW)

(72) Inventors: Chao-Chang Hu, Taoyuan (TW); Liang-Ting Ho, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/851,865

(22) Filed: Apr. 17, 2020

(65) Prior Publication Data

US 2020/0336639 A1 Oct. 22, 2020

Related U.S. Application Data

(60) Provisional application No. 62/836,405, filed on Apr. 19, 2019, provisional application No. 62/879,190, filed on Jul. 26, 2019.

(51) Int. Cl.
| | |
|---|---|
| *H04N 5/225* | (2006.01) |
| *G03B 17/55* | (2021.01) |
| *H02K 41/035* | (2006.01) |
| *H02N 2/00* | (2006.01) |
| *H02N 2/02* | (2006.01) |

(52) U.S. Cl.
CPC .......... *H04N 5/2259* (2013.01); *G03B 17/55* (2013.01); *H02K 41/0356* (2013.01); *H02N 2/009* (2013.01); *H02N 2/028* (2013.01); *H04N 5/2253* (2013.01); *H04N 5/2254* (2013.01); *H04N 5/22521* (2018.08)

(58) Field of Classification Search
CPC ..................................................... H04N 5/2259
USPC ........................................................... 348/294
See application file for complete search history.

(56) References Cited

U.S. PATENT DOCUMENTS

2008/0055420 A1* 3/2008 Orihashi .............. H04N 5/2253
348/208.4

* cited by examiner

*Primary Examiner* — Joel W Fosselman
(74) *Attorney, Agent, or Firm* — Muncy, Geissler, Olds & Lowe, P.C.

(57) ABSTRACT

A photosensitive element driving mechanism includes a fixed assembly, a first movable assembly and a first driving assembly. The first movable assembly is movable relative to the fixed assembly, and the first movable assembly is configured to be connected to a photosensitive element. The photosensitive element corresponds to an optical element. The first driving assembly is configured to drive the first movable assembly to move relative to the fixed assembly. The first movable assembly includes a heat dissipation structure corresponding to the first driving assembly, the optical element or the photosensitive element.

19 Claims, 28 Drawing Sheets

PHOTOSENSITIVE ELEMENT DRIVING MECHANISM

CROSS REFERENCE TO RELATED APPLICATIONS

This application claims the benefit of U.S. Provisional Application No. 62/836,405, filed Apr. 19, 2019, U.S. Provisional Application No. 62/879,190, filed Jul. 26, 2019, the entirety of which are incorporated by reference herein.

BACKGROUND OF THE DISCLOSURE

Field of the Disclosure

The present disclosure relates to a driving mechanism, and in particular it relates to a photosensitive element driving mechanism for driving a photosensitive element.

Description of the Related Art

As technology has progressed, many kinds of electronic devices such as tablet computers and smartphones have begun to include the functionality of digital photography and video recording. A user can operate the electronic device to capture various images with an photosensitive element driving mechanism (such as a camera module) that is included in the electronic device, and therefore electronic devices equipped with camera modules have gradually become popular.

Today's design of electronic devices continues to move toward the trend of miniaturization so that the various components of the camera module or its structure must also be continuously reduced, so as to achieve the purpose of miniaturization. In general, a driving mechanism of the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can make the image clearer is a topic nowadays that needs to be discussed and solved.

BRIEF SUMMARY OF THE DISCLOSURE

Accordingly, one objective of the present disclosure is to provide a photosensitive element driving mechanism to solve the above problems.

According to some embodiments, a photosensitive element driving mechanism includes a fixed assembly, a first movable assembly and a first driving assembly. The first movable assembly is movable relative to the fixed assembly, and the first movable assembly is configured to be connected to a photosensitive element. The photosensitive element corresponds to an optical element. The first driving assembly is configured to drive the first movable assembly to move relative to the fixed assembly. The first movable assembly includes a heat dissipation structure corresponding to the first driving assembly, the optical element or the photosensitive element.

According to some embodiments, the first movable assembly includes a substrate configured to support the photosensitive element, and a plurality of circuit elements is disposed on the substrate. and is electrically connected to the photosensitive element.

According to some embodiments, the first movable assembly further includes a circuit board and a first heat conducting element, the circuit board is disposed between the photosensitive element and the substrate, and the first heat conducting element is disposed between the circuit board and the substrate.

According to some embodiments, the first heat conducting element includes a plurality of heat-conducting particles.

According to some embodiments, the first movable assembly further includes a second heat conducting element disposed in the circuit board and connected to the photosensitive element and the substrate.

According to some embodiments, the substrate is disposed between the circuit board and the optical element, and an opening corresponding to the photosensitive element is formed on the substrate.

According to some embodiments, the first driving assembly includes a plurality of first driving magnetic elements and a plurality of first driving coils which are correspondingly disposed on a plurality of sides of the substrate.

According to some embodiments, the substrate is made of a magnetically conductive material, and the substrate corresponds to these first driving magnetic elements.

According to some embodiments, the fixed assembly includes a base plate, and a gap is formed between the substrate and the base plate.

According to some embodiments, the substrate includes a plurality of movable cantilevers, extending in a direction perpendicular to a main axis of the fixed assembly.

According to some embodiments, a bottom surface of the substrate faces the base plate, and a heat dissipation structure is formed on the bottom surface.

According to some embodiments, the fixed assembly further includes a plurality of supporting elements disposed on the base plate, and the supporting elements are configured to support the substrate, so that the substrate slides in a direction perpendicular to the main axis.

According to some embodiments, each movable cantilever has a first turning portion and a second turning portion, and the first turning portion and the second turning portion are bent in different directions.

According to some embodiments, each movable cantilever has a plate-shaped structure, and the plate-shaped structure has a first thickness direction, the first turning portion is bent around a first axis, and the first axis is not parallel to the first thickness direction.

According to some embodiments, the plate-shaped structure has a second thickness direction, the second turning portion is bent around a second axis, and the second axis is parallel to the second thickness direction.

According to some embodiments, an electronic component is disposed on the base plate, each of the movable cantilevers has a third turning portion, and when viewed in a direction perpendicular to the main axis, the third turning portion partially overlaps the electronic component.

According to some embodiments, the substrate includes a main body, each of the movable cantilevers has a first end portion and a second end portion, respectively connected to the main body and the base plate, and there is a distance between the first end portion and the second end portion in the main axis.

According to some embodiments, the substrate includes a main body, each of the movable cantilevers has a first end portion and a second end portion, respectively connected to the main body and the base plate, and the first end portion and the second end portion are at a same level on the main axis.

According to some embodiments, the substrate includes two pairs of movable cantilevers disposed on two opposite sides of the main body.

According to some embodiments, an insulating element is disposed on the substrate and is continuously distributed on the movable cantilevers, and these circuit elements are disposed on the insulating element.

The present disclosure provides a photosensitive element driving mechanism which has a first driving assembly and a first movable assembly. The first movable assembly is supported by the supporting elements and is suspended in the outer frame of the fixed assembly. The photosensitive element is disposed on the circuit member of the first movable assembly, and the first driving assembly is configured to drive the circuit member and the photosensitive element to move relative to the fixed assembly, so as to achieve the purpose of optical image stabilization.

Furthermore, in some embodiments, the bottom surface of the substrate (the circuit member) faces the base plate, and a heat dissipation structure (such as a plurality of fin structures) may be formed on the bottom surface to increase the heat dissipation efficiency of the photosensitive element.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
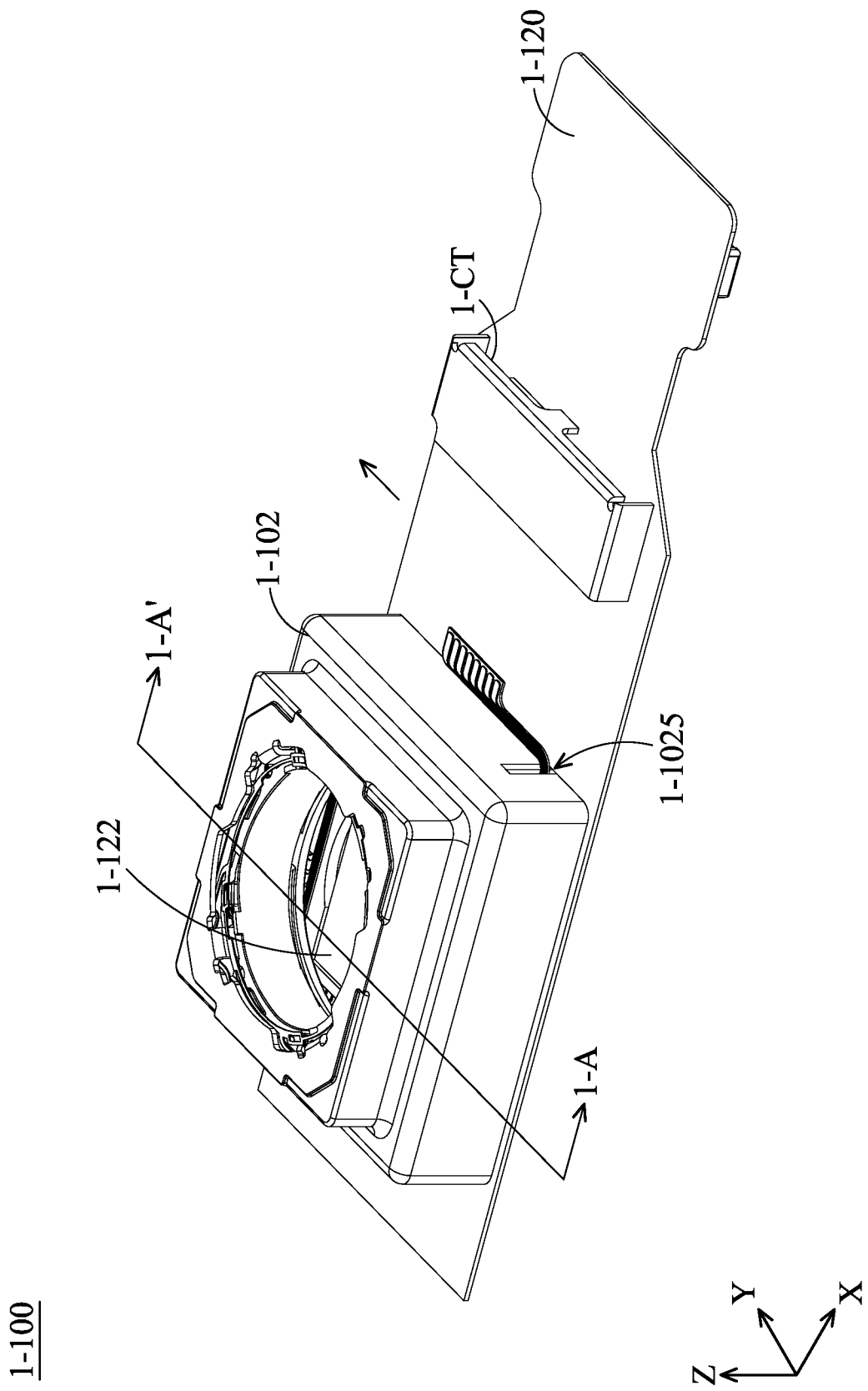
FIG. 1 shows a schematic diagram of a photosensitive element driving mechanism 1-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "first", "second", "third", "fourth", and the like are merely generic identifiers and, as such, may be interchanged in various embodiments. For example, while an element may be referred to as a "first" element in some embodiments, the element may be referred to as a "second" element in other embodiments.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

The First Embodiment Group

Figure 2:
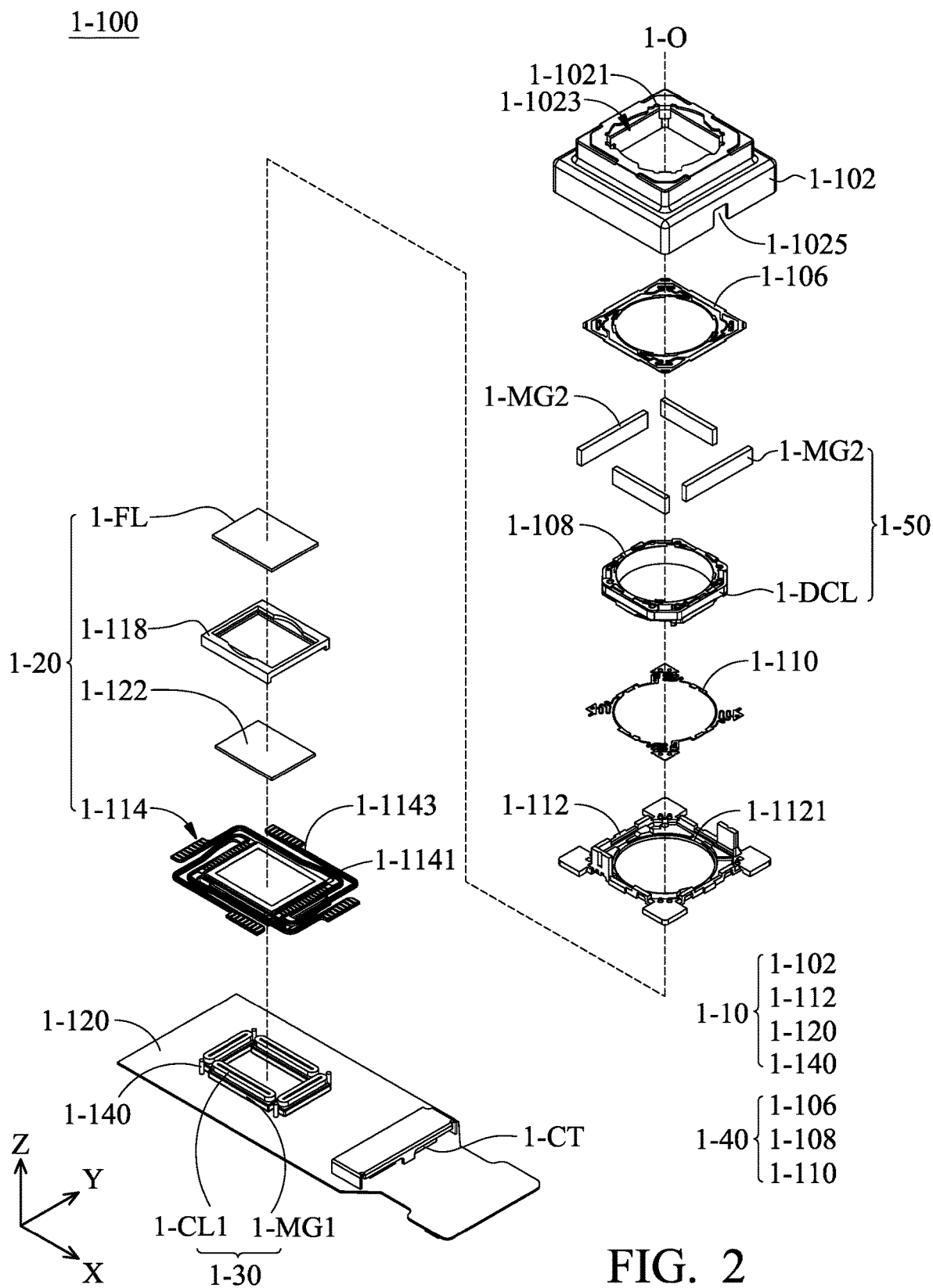
FIG. 2 shows an exploded diagram of the photosensitive element driving mechanism 1-100 according to the embodiment of the present disclosure.
Figure 3:
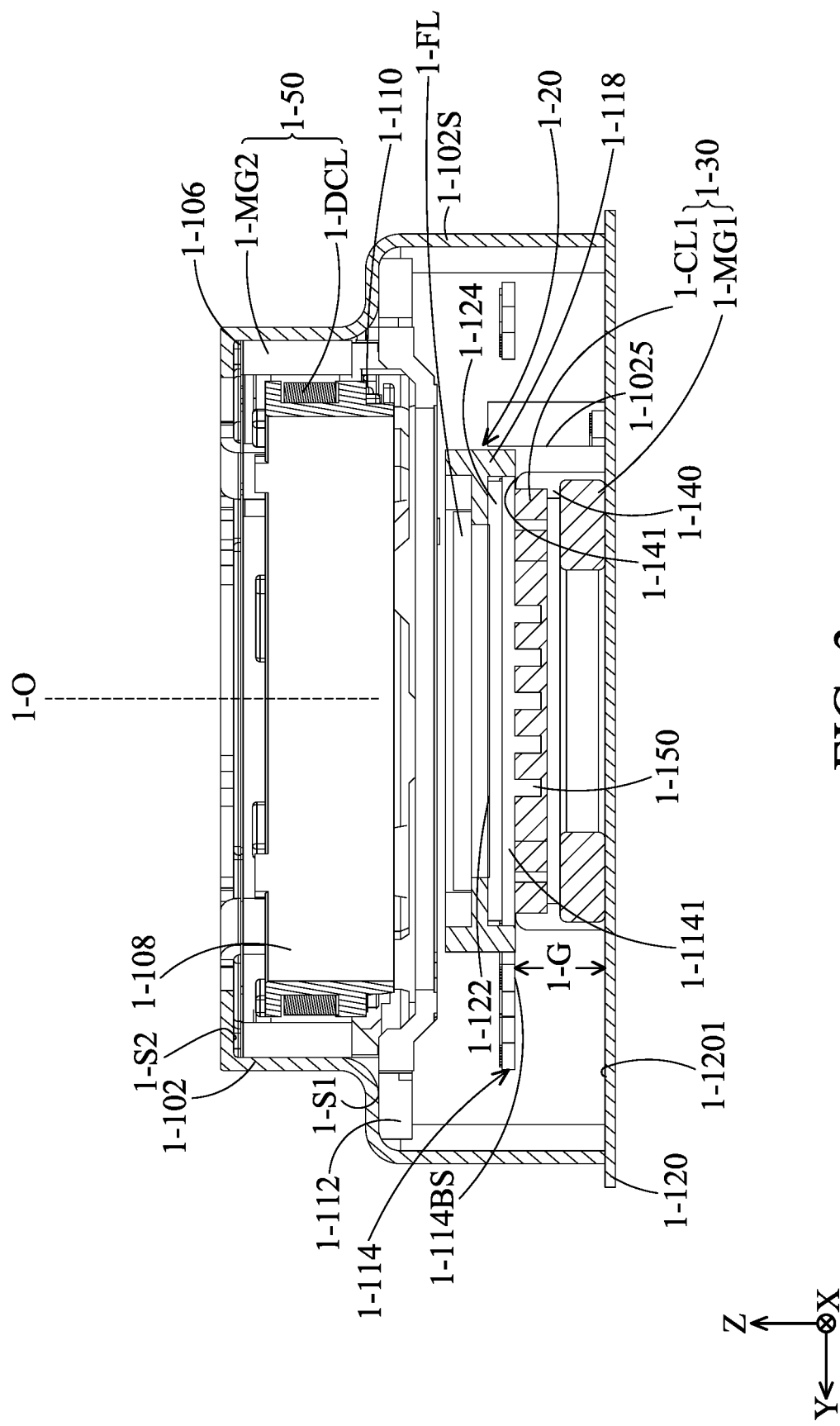
FIG. 3 shows a cross-sectional view along line 1-A-1-A' in FIG. 1 according to the embodiment of the present disclosure.

Please refer to FIG. 1 to FIG. 3. FIG. 1 shows a schematic diagram of an photosensitive element driving mechanism 1-100 according to an embodiment of the present disclosure, FIG. 2 shows an exploded diagram of the photosensitive element driving mechanism 1-100 according to the embodiment of the present disclosure, and FIG. 3 shows a cross-sectional view along line 1-A-1-A' in FIG. 1 according to the embodiment of the present disclosure. The photosensitive element driving mechanism 1-100 can be an optical camera system and can be configured to hold and drive an optical component (not shown in the figures). The photosensitive element driving mechanism 1-100 can be installed in different electronic devices or portable electronic devices, such as a smartphone or a tablet computer, for allowing a user to perform the image capturing function. In this embodiment, the photosensitive element driving mechanism 1-100 can be a voice coil motor (VCM) with an auto-focusing (AF) function, but it is not limited thereto. In other embodiments, the photosensitive element driving mechanism 1-100 can also perform the functions of auto-focusing and optical image stabilization (OIS).

As shown in FIG. 1 to FIG. 3, in the embodiment, the photosensitive element driving mechanism 1-100 mainly includes a fixed assembly 1-10, a first movable assembly 1-20, a first driving assembly 1-30, and a second movable assembly 1-40, a second driving assembly 1-50 and a control circuit 1-CT. The first driving assembly 1-30 is configured to drive the first movable assembly 1-20 to move relative to the fixed assembly 1-10, and the second driving assembly 1-50 is configured to drive the second movable assembly 1-40 to move relative to the fixed assembly 1-10. The control circuit 1-CT is configured to control operation of the first driving assembly 1-30 and the second driving assembly 1-50.

In this embodiment, the fixed assembly 1-10 can include an outer frame 1-102, a base 1-112, and a base plate 1-120. The second movable assembly 1-40 can include a first elastic member 1-106, a holder 1-108, and a second elastic member 1-110. The second driving assembly 1-50 can include a plurality of second magnetic driving elements 1-MG2 and a driving coil 1-DCL.

As shown in FIG. 2, the outer frame 1-102 has a hollow structure, and an outer frame opening 1-1021 is formed on the outer frame 1-102. A base opening 1-1121 is formed on the base 1-112. The center of the outer frame opening 1-1021 corresponds to an optical axis 1-O of optical component (not shown) which is held by the holder 1-108. The base opening 1-1121 corresponds to an image sensing element (the photosensitive element 1-122) disposed below the base 1-112. External light can enter the outer frame 1-102 through the outer frame opening 1-1021, and then to be received by the photosensitive element 1-122 after traveling through the optical component and the base opening 1-1121, so as to generate a digital image signal. In this embodiment, a main axis is defined by the outer frame 1-102 and the base plate 1-120, and the main axis is parallel to the optical axis 1-O.

Furthermore, the outer frame 1-102 can have an accommodating space 1-1023 configured to accommodate the first movable assembly 1-20, the first driving assembly 1-30, the second movable assembly 1-40, and the second driving assembly 1-50. It should be noted that the outer frame 1-102 is fixedly disposed on the base plate 1-120, and the control circuit 1-CT is disposed outside the outer frame 1-102 and disposed on the base plate 1-120, but it is not limited thereto. In other embodiments, the control circuit 1-CT can be disposed in the accommodating space 1-1023 of the outer frame 1-102.

In this embodiment, the second driving assembly 1-50 includes four second magnetic driving elements 1-MG2, and the shape of the second magnetic driving elements 1-MG2 may be a long strip-shaped structure, but the number and shape of the second magnetic driving elements 1-MG2 are not limited thereto. Furthermore, the second magnetic driving element 1-MG2 can be a multi-pole magnet.

As shown in FIG. 2 and FIG. 3, the second magnetic driving elements 1-MG2 are fixedly disposed on the inner wall surface of the outer frame 1-102. In this embodiment, the driving coil 1-DCL may be a winding coil and may be disposed around the holder 1-108, and the driving coil 1-DCL corresponds to the plurality of second magnetic driving elements 1-MG2. When the driving coil 1-DCL is provided with electricity, the driving coil 1-DCL acts with the plurality of second magnetic driving elements 1-MG2 generate to an electromagnetic force to drive the holder 1-108 and the optical component to move in a first direction relative to the base 1-112, such the direction of the optical axis 1-O (the Z-axis).

In this embodiment, the first elastic member 1-106 is disposed on the second magnetic driving elements 1-MG2, the outer portion of the first elastic member 1-106 is fixed to the second magnetic driving elements 1-MG2 (or the outer frame 1-102), and the outer portion of the second elastic member 1-110 is fixed to corners of the base 1-112. In addition, the inner portions of the first elastic member 1-106 and the second elastic member 1-110 are respectively connected to the upper side and the lower side of the holder 1-108, so that the holder 1-108 can be suspended in the outer frame 1-102 (as shown in FIG. 3). Accordingly, the second driving assembly 1-50 can drive the holder 1-108 to move relative to the fixed assembly 1-10.

As shown in FIG. 3, the first driving assembly 1-30 is disposed between the first movable assembly 1-20 and the base plate 1-120. When viewed in the direction of the optical axis 1-O, the first driving assembly 1-30 partially overlaps the first movable assembly 1-20. Furthermore, the outer frame 1-102 has a first top surface 1-S1, a second top surface 1-S2 and a side wall 1-102S. The first top surface 1-S1 faces the first movable assembly 1-20, and the base 1-112 is fixed to the first top surface 1-S1. In addition, the second driving assembly 1-50 is disposed between the base 1-112 and the first driving assembly 1-30, and when viewed in the direction of the optical axis 1-O, the base 1-112 partially overlaps the first top surface 1-S1.

As shown in FIG. 3, the distance between the second top surface 1-S2 and the first movable assembly 1-20 is greater than the distance between the first top surface 1-S1 and the first movable assembly 1-20 (in the direction of the optical axis 1-O). The side wall 1-102S is parallel to the optical axis 1-O, and when viewed in the direction of the optical axis 1-O, the circuit member 1-114 partially overlaps the side wall 1-102S (FIG. 1).

In this embodiment, the first movable assembly 1-20 can include a filter 1-FL, a first frame 1-118, a photosensitive element 1-122 a circuit board 1-124, and a substrate (a circuit member 1-114). The filter 1-FL is disposed on the first frame 1-118 and configured to filter the light received by the photosensitive element 1-122. The substrate (the circuit member 1-114) includes a main body (a circuit member body 1-1141) configured to support the circuit board 1-124 and the photosensitive element 1-122. The photosensitive element 1-122 is disposed on the circuit board 1-124, and the photosensitive element 1-122 corresponds an optical element (not shown) held by the holder 1-108.

Furthermore, the first frame 1-118 is configured to accommodate the photosensitive element 1-122, and the first frame 1-118 can protect the circuit board 1-124 and the photosensitive element 1-122 so as to prevent the photosensitive element 1-122 from being damaged due to collisions with other components when the first movable assembly 1-20 moves.

Figure 4:
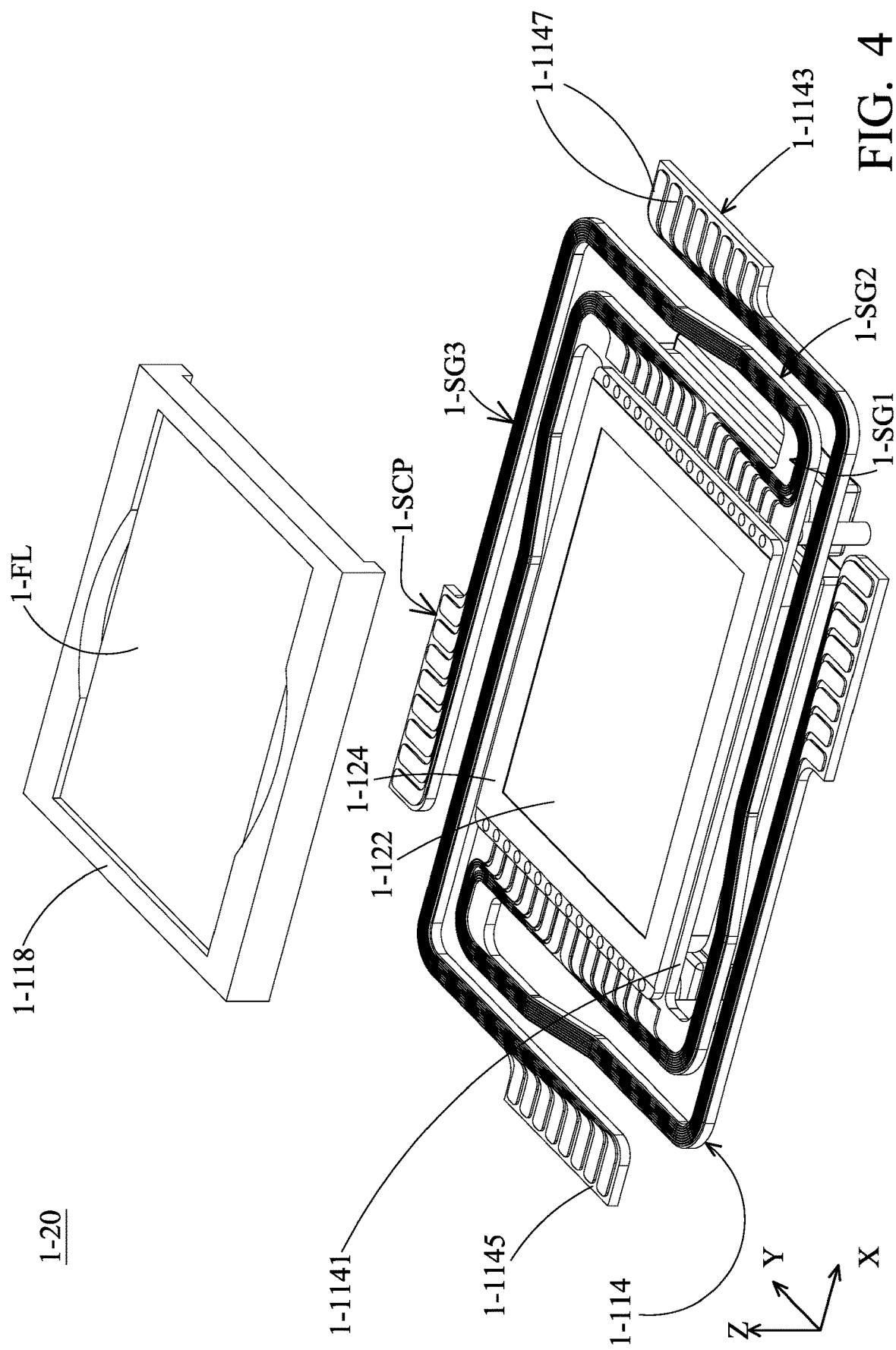
FIG. 4 is an exploded diagram of the first movable assembly 1-20 according to an embodiment of the present disclosure. In this embodiment.

Please refer to FIG. 2 to FIG. 4 together. FIG. 4 is an exploded diagram of the first movable assembly 1-20 according to an embodiment of the present disclosure. In this embodiment, the circuit member 1-114 can include a plurality of movable cantilevers 1-1143, extending in a direction perpendicular to the main axis. For example, the circuit member 1-114 in FIG. 4 includes two pairs of movable cantilevers 1-1143 connected to the circuit member body 1-1141 and disposed on two opposite sides of the circuit member body 1-1141. By providing two pairs of the movable cantilevers 1-1143 on two sides of the circuit member body 1-1141, the overall structure of the first movable assembly 1-20 can be symmetrical and easier to achieve balance.

As shown in FIG. 4, each movable cantilever 1-1143 can have a first segment 1-SG1, a second segment 1-SG2, a third segment 1-SG3 and a connecting portion 1-SCP. The first segment 1-SG1 and the second segment 1-SG2 extend along directions different from the optical axis 1-O (for example, along the X-axis or the Y-axis), and the second segment 1-SG2 and the first segment 1-SG1 extend in different directions.

One end (the first end portion) of the first segment 1-SG1 is connected to the circuit member body 1-1141 (the main body), and the other end of the first segment 1-SG1 is connected to the second segment 1-SG2. The second segment 1-SG2 is connected between the third segment 1-SG3 and the first segment 1-SG1, the third segment 1-SG3 is connected between the connecting portion 1-SCP and the second segment 1-SG2, and the connecting portion 1-SCP (the second end portion) is fixedly connected to the base plate 1-120 so that the circuit member body 1-1141 of the first movable assembly 1-20 can move relative to the fixed assembly 1-10 by the movable cantilever 1-1143.

Based on such a structural design of the first segment 1-SG1, the second segment 1-SG2 and the third segment 1-SG3, a portion of the circuit member 1-114 can be elastic so as to facilitate movement of the circuit member body 1-1141 in a direction perpendicular to the optical axis 1-O.

When the first driving assembly 1-30 drives the circuit member body 1-1141 to move in a first moving direction (for example, the Y-axis), the amount of deformation of the first segment 1-SG1 and the third segment 1-SG3 is greater than the amount of deformation of the second segment 1-SG2. When the first driving assembly 1-30 drives the circuit member body 1-1141 to move in a second moving direction (for example, the X-axis), the amount of deformation of the first segment 1-SG1 and the third segment 1-SG3 is smaller than the amount of deformation of the second segment 1-SG2, and the first moving direction is not parallel to the second moving direction.

In some embodiments, the circuit member body 1-1141 and the movable cantilevers 1-1143 are integrally formed in one piece and are made of a flexible material. Furthermore, an insulating layer 1-1145 (the insulating element) is disposed on the substrate (the circuit member 1-114), which is continuously distributed on the movable cantilevers 1-1143, and a plurality of circuit elements 1-1147 (the conductive lines) is disposed on the substrate. These circuit elements 1-1147 are disposed on the insulating layer 1-1145 and are electrically connected to the photosensitive element 1-122

It should be noted that, only the photosensitive element 1-122 is disposed on the circuit member body 1-1141, thereby increasing the area of the photosensitive element 1-122 and improving the photographing effect.

Please continue to refer to FIG. 3 and FIG. 4, in this embodiment, there is a gap formed between the first movable assembly 1-20 and the fixed assembly 1-10. Specifically, as shown in FIG. 3, the base plate 1-120 has a bottom surface 1-1201 perpendicular to the optical axis 1-O and facing the first movable assembly 1-20. In addition, a gap 1-G is formed between the substrate (the circuit member body 1-1141) and the bottom surface 1-1201 of the base plate 1-120.

As shown in FIG. 2 and FIG. 3, the first driving assembly 1-30 includes a plurality of first driving magnetic elements 1-MG1 and a plurality of first driving coils 1-CL1, these first driving magnetic elements 1-MG1 and the first driving coils 1-CL1 are correspondingly disposed on a plurality of sides of the substrate (the circuit member 1-114). In addition, the fixed assembly 1-10 further includes a plurality of supporting elements 1-140 disposed on the base plate 1-120, and the supporting elements 1-140 are configured to support the substrate. Based on the design of the first driving assembly 1-30 and the first movable assembly 1-20, the substrate can slide in the direction perpendicular to the main axis, for example, moving along the X-axis or Y-axis, so that the photosensitive element driving mechanism 1-100 can have the functions of optical image stabilization and shake compensation.

In this embodiment, as shown in FIG. 2 and FIG. 3, the supporting element 1-140 may be a cylinder, but it is not limited thereto. In other embodiments, the supporting element 1-140 may be implemented as a spherical body. The supporting element 1-140 may have an arc surface 1-141 that contacts a bottom surface 1-114BS of the substrate (the circuit member 1-114). Based on the design of the arc surface 1-141, the circuit member 1-114 may move more smoothly.

In addition, it is worth noting that in some embodiments, the substrate (the circuit member 1-114) may be made of a magnetically conductive material, and the substrate corresponds to these first driving magnetic elements 1-MG1. The magnetic attraction force generated between the substrate (the circuit member 1-114) and the first driving magnetic elements 1-MG1 can make the substrate move along the XY plane more stably.

As shown in FIG. 3 and FIG. 4, the first segment 1-SG1 is connected to one end (the first end portion) of the circuit member body 1-1141. Because the connecting portion 1-SCP is connected to the base plate 1-120, there is a distance between the first end portion and the connecting portion 1-SCP (the second end portion) in the main axis (the Z-axis).

Based on the design of the supporting elements 1-140, the first movable assembly 1-20 is supported by the supporting elements 1-140 and is suspended in the outer frame 1-102, so that when the first driving assembly 1-30 drives the circuit member body 1-1141 and the photosensitive element 1-122 to move along the XY plane, the circuit member body 1-1141 does not collide with the base plate 1-120.

In other embodiments, the first driving assembly 1-30 is disposed between the first movable assembly 1-20 and the second movable assembly 1-40, and the supporting elements 1-140 are omitted. Thus, one end (the first end portion) of the first segment 1-SG1 and the connecting portion 1-SCP (the second end portion) are at the same level in the main axis. That is, the first end portion and the second end portion are on the same plane.

Figure 5:
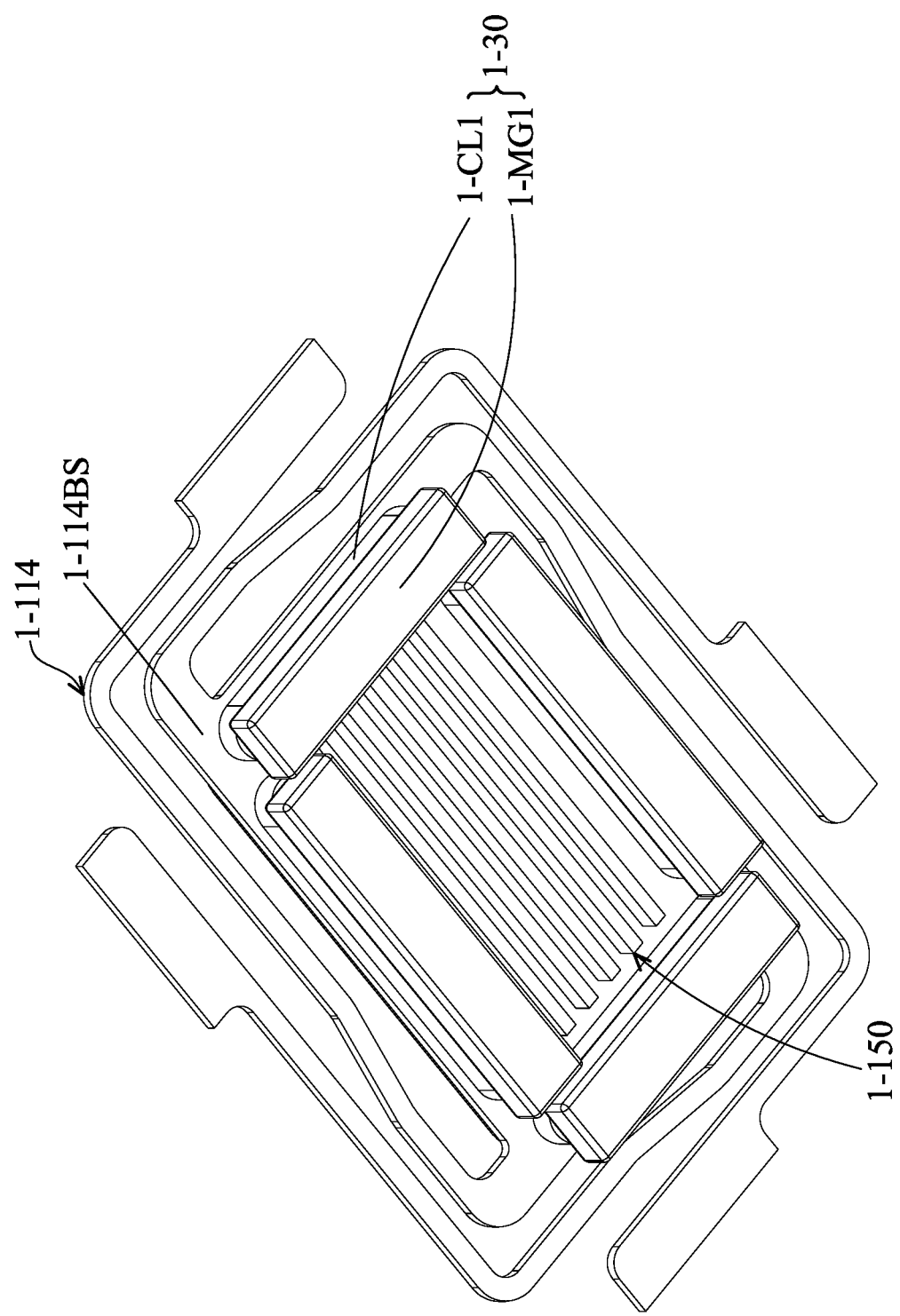
FIG. 5 is a schematic diagram of a partial structure of the first movable assembly 1-20 and the first driving assembly 1-30 in another view according to an embodiment of the present disclosure.

Please refer to FIG. 3 and FIG. 5. FIG. 5 is a schematic diagram of a partial structure of the first movable assembly 1-20 and the first driving assembly 1-30 in another view according to an embodiment of the present disclosure. As shown in FIG. 3 and FIG. 5, the bottom surface 1-114BS of the substrate (the circuit member 1-114) faces the base plate 1-120, and a heat dissipation structure 1-150 may be formed on the bottom surface 1-114BS to increase the heat dissipation efficiency of the photosensitive element 1-122. Specifically, in this embodiment, the heat dissipation structure 1-150 may include a plurality of fin structures, but it is not limited thereto.

The heat dissipation structure 1-150 corresponds to the first driving assembly 1-30, the optical element or the photosensitive element 1-122. For example, as shown in FIG. 5, the heat dissipation structure 1-150 is surrounded by the first driving assembly 1-30. Furthermore, when viewed in the optical axis 1-O, the heat dissipation structure 1-150 overlaps the photosensitive element 1-122 or the optical element, and the heat dissipation structure 1-150 does not overlap the first driving assembly 1-30.

Furthermore, as shown in FIG. 1 and FIG. 3, two side openings 1-1025 are formed on the outer frame 1-102 so that the outermost movable cantilevers 1-1143 can pass through the side openings 1-1025 to the outside of the outer frame 1-102. When the photosensitive element driving mechanism 1-100 is assembled, the side openings 1-1025 of the outer frame 1-102 can assist the movable cantilevers 1-1143 to be positioned, thereby improving the overall structural strength and improving workability at the same time, making it easy to produce and assemble.

Figure 6:
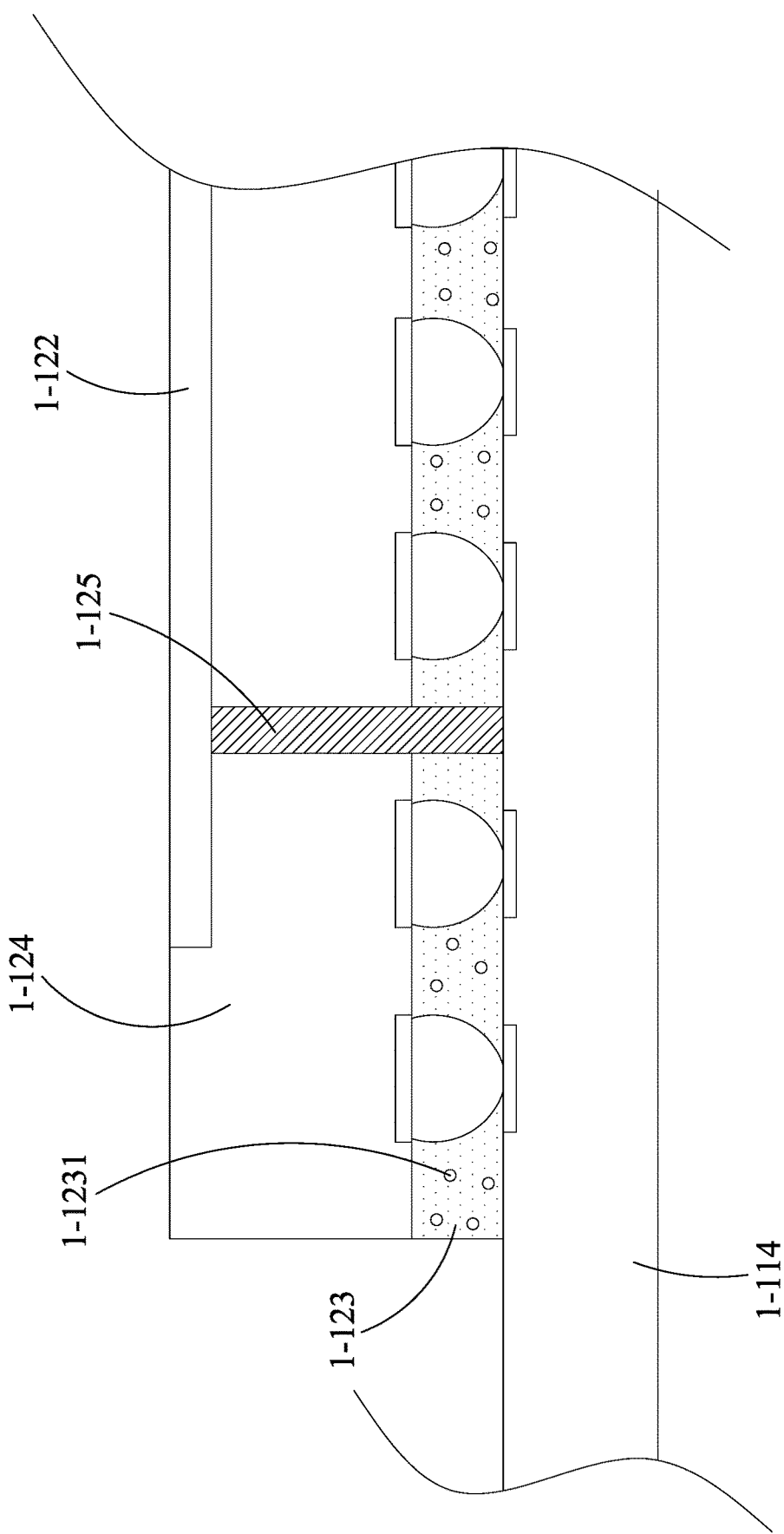
FIG. 6 is an enlarged schematic diagram of a partial structure of the first movable assembly 1-20 according to an embodiment of the present disclosure.

Next, please refer to FIG. 6, which is an enlarged schematic diagram of a partial structure of the first movable assembly 1-20 according to an embodiment of the present disclosure. As shown in FIG. 6, the circuit board 1-124 is disposed between the photosensitive element 1-122 and the substrate (the circuit member 1-114), and the circuit board 1-124 is connected to the circuit member 1-114 using a ball grid array (BGA) packaging technology. In order to increase the heat dissipation effect of the photosensitive element 1-122, the first movable assembly 1-20 may further include a first heat conducting element 1-123, and the first heat conducting element 1-123 is disposed between the circuit board 1-124 and the circuit member 1-114. Specifically, the first heat conducting element 1-123 may be a heat-conducting glue, and the first heat conducting element 1-123 contains a plurality of heat-conducting particles 1-1231. The heat-conducting particles 1-1231 may be thermally conductive but non-electrical conductive particles, such as carbon particles.

In some embodiments, as shown in FIG. 6, the first movable assembly 1-20 may further include a second heat conducting element 1-125 disposed in the circuit board 1-124 and connected to the photosensitive element 1-122 and the circuit member 1-114. The second heat conducting element 1-125 may be a metal through hole (via), but is not limited thereto.

Figure 7:
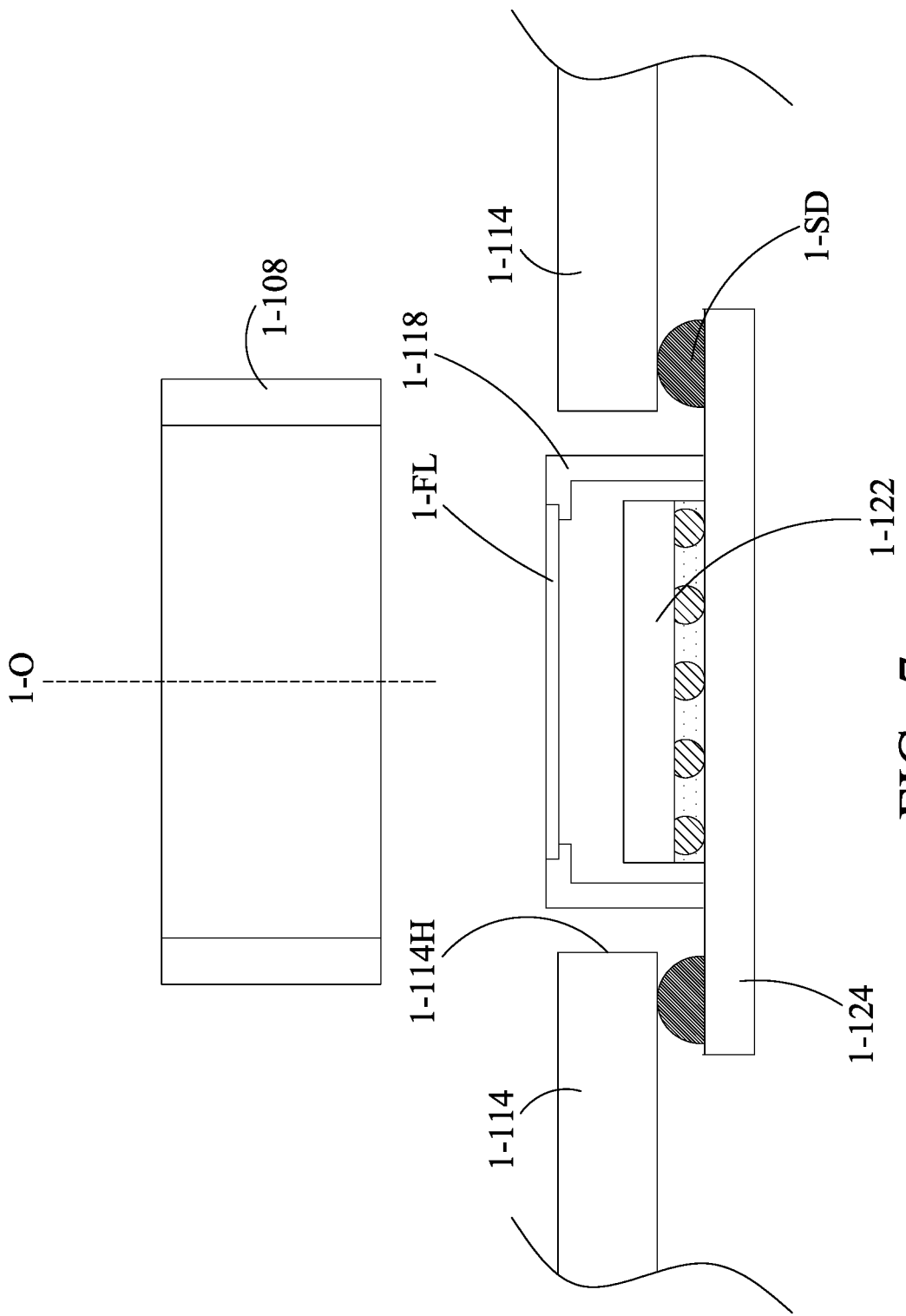
FIG. 7 is an enlarged schematic diagram of a partial structure of the first movable assembly 1-20 according to another embodiment of the present disclosure.

Next, please refer to FIG. 7, which is an enlarged schematic diagram of a partial structure of the first movable assembly 1-20 according to another embodiment of the present disclosure. In this embodiment, the substrate (the circuit member 1-114) is disposed between the circuit board 1-124 and the optical element held by the holder 1-108, and an opening 1-114H corresponding to the photosensitive element 1-122 may be formed on the substrate. In addition, in this embodiment, the circuit board 1-124 is connected to the substrate by solder 1-SD, and the photosensitive element 1-122 is connected to the circuit board 1-124 using the ball grid array (BGA) technology.

Figure 8:
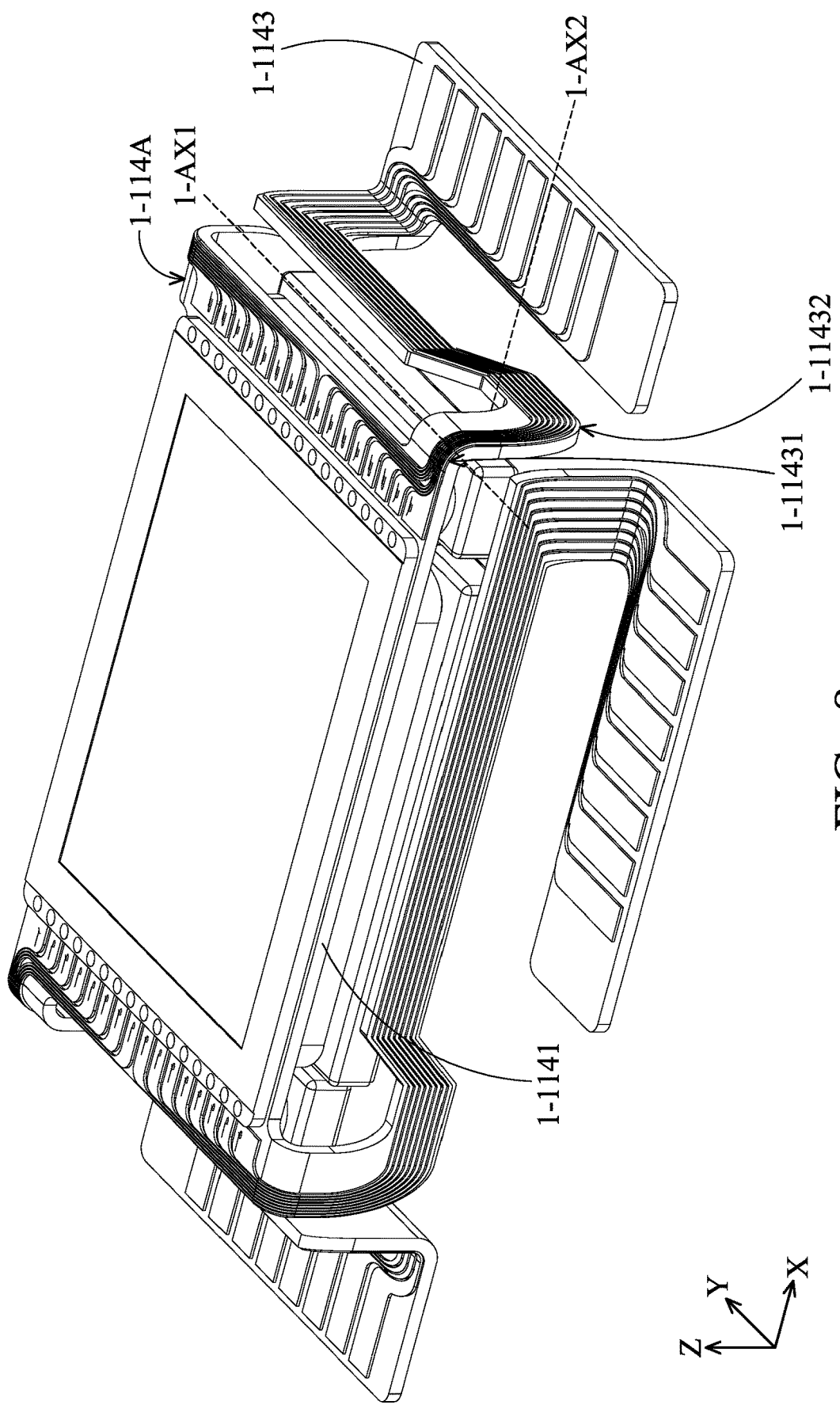
FIG. 8 is a schematic diagram of a circuit member 1-114A according to another embodiment of the present disclosure.

Please refer to FIG. 8, which is a schematic diagram of a circuit member 1-114A according to another embodiment of the present disclosure. In this embodiment, the circuit member 1-114A has four movable cantilevers 1-1143 connected to the four sides of the circuit member body 1-1141 respectively. The movable cantilever 1-1143 has a first turning portion 1-11431 and a second turning portion 1-11432, and the first turning portion 1-11431 and the second turning portion 1-11432 are bent in different directions.

As shown in FIG. 8, each movable cantilever 1-1143 has a plate-shaped structure, and the plate-shaped structure can define a first thickness direction (the Z-axis) at the first turning portion 1-11431, and the first turning portion 1-11431 is bent relative to an axis that is not parallel to the first thickness direction. Specifically, the first turning portion 1-11431 is bent around a first axis 1-AX1, such as the Y-axis, and the first axis 1-AX1 is not parallel to the first thickness direction.

Furthermore, the plate-shaped structure may define a second thickness direction (the X-axis) at the second turning portion 1-11432, and the second turning portion 1-11432 is bent relative to an axis parallel to the second thickness direction. Specifically, the second turning portion 1-11432 is bent around a second axis 1-AX2 which is parallel to the X-axis. That is, the second axis 1-AX2 is parallel to the second thickness direction.

Figure 9:
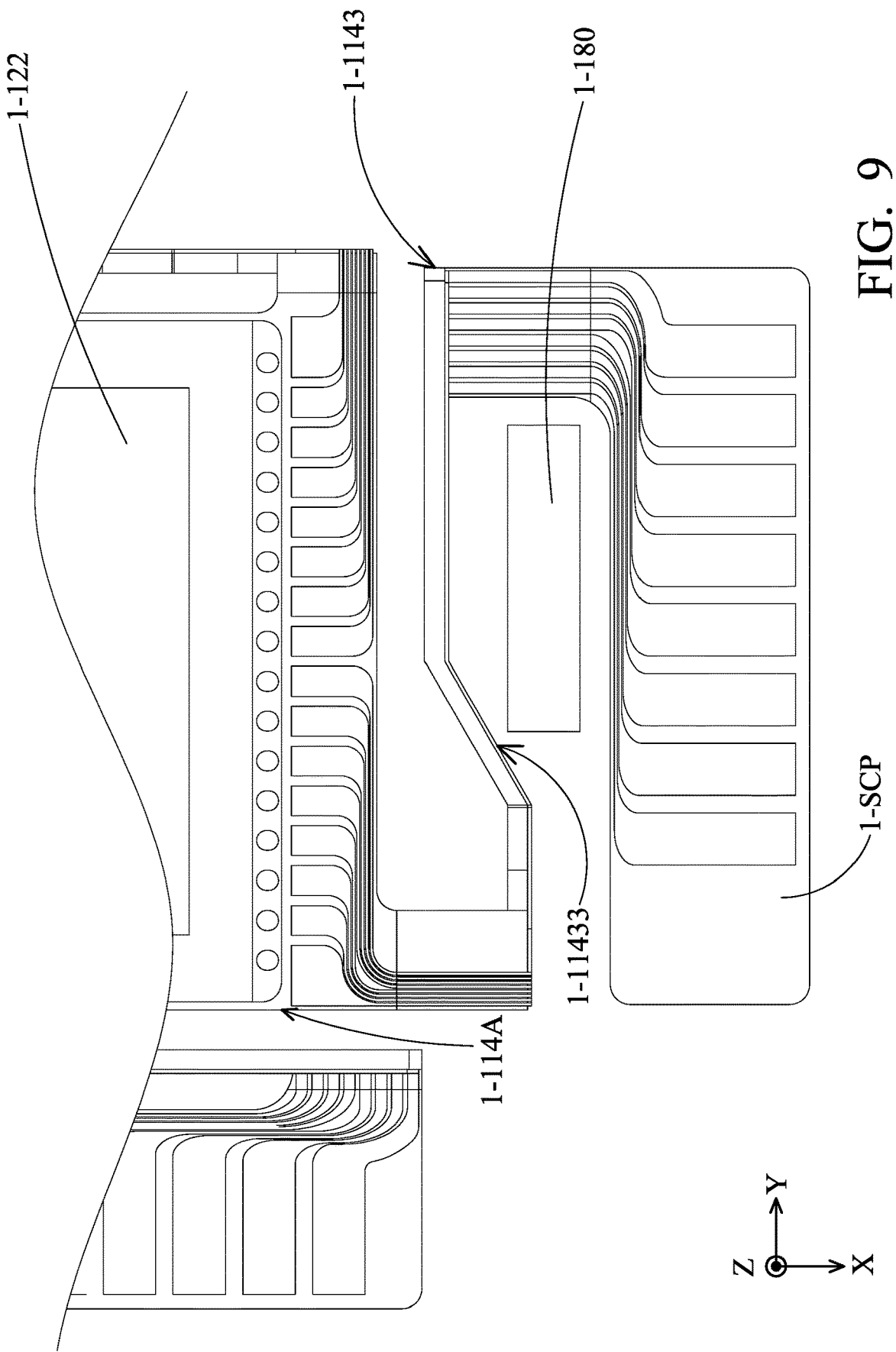
FIG. 9 is a top view of a partial structure of the circuit member 1-114A according to another embodiment of the present disclosure.

Please refer to FIG. 8 and FIG. 9. FIG. 9 is a top view of a partial structure of the circuit member 1-114A according to another embodiment of the present disclosure. An electronic component 1-180 (such as a resistor or a capacitor) is disposed on the base plate 1-120, and the movable cantilever 1-1143 has a third turning portion 1-11433. As shown in FIG. 9, when viewed in a direction perpendicular to the main axis, for example, along the X-axis or the Y-axis, the third turning portion 1-11433 partially overlaps the electronic component 1-180. Because the electronic component 1-180 is disposed between the third turning portion 1-11433 and the connecting portion 1-SCP and the electronic component 1-180 does not collide with the movable cantilever 1-1143, the purpose of miniaturization can be achieved.

The present disclosure provides a photosensitive element driving mechanism 1-100 which has a first driving assembly 1-30 and a first movable assembly 1-20. The first movable assembly 1-20 is supported by the supporting elements 1-140 and is suspended in the outer frame 1-102 of the fixed assembly 1-10. The photosensitive element 1-122 is disposed on the circuit member 1-114 of the first movable assembly 1-20, and the first driving assembly 1-30 is configured to drive the circuit member 1-114 and the photosensitive element 1-122 to move relative to the fixed assembly 1-10, so as to achieve the purpose of optical image stabilization.

Furthermore, in some embodiments, the bottom surface 1-114BS of the substrate (the circuit member 1-114) faces the base plate 1-120, and a heat dissipation structure 1-150 (such as a plurality of fin structures) may be formed on the bottom surface 1-114BS to increase the heat dissipation efficiency of the photosensitive element 1-122.

The Second Embodiment Group

Figure 10:
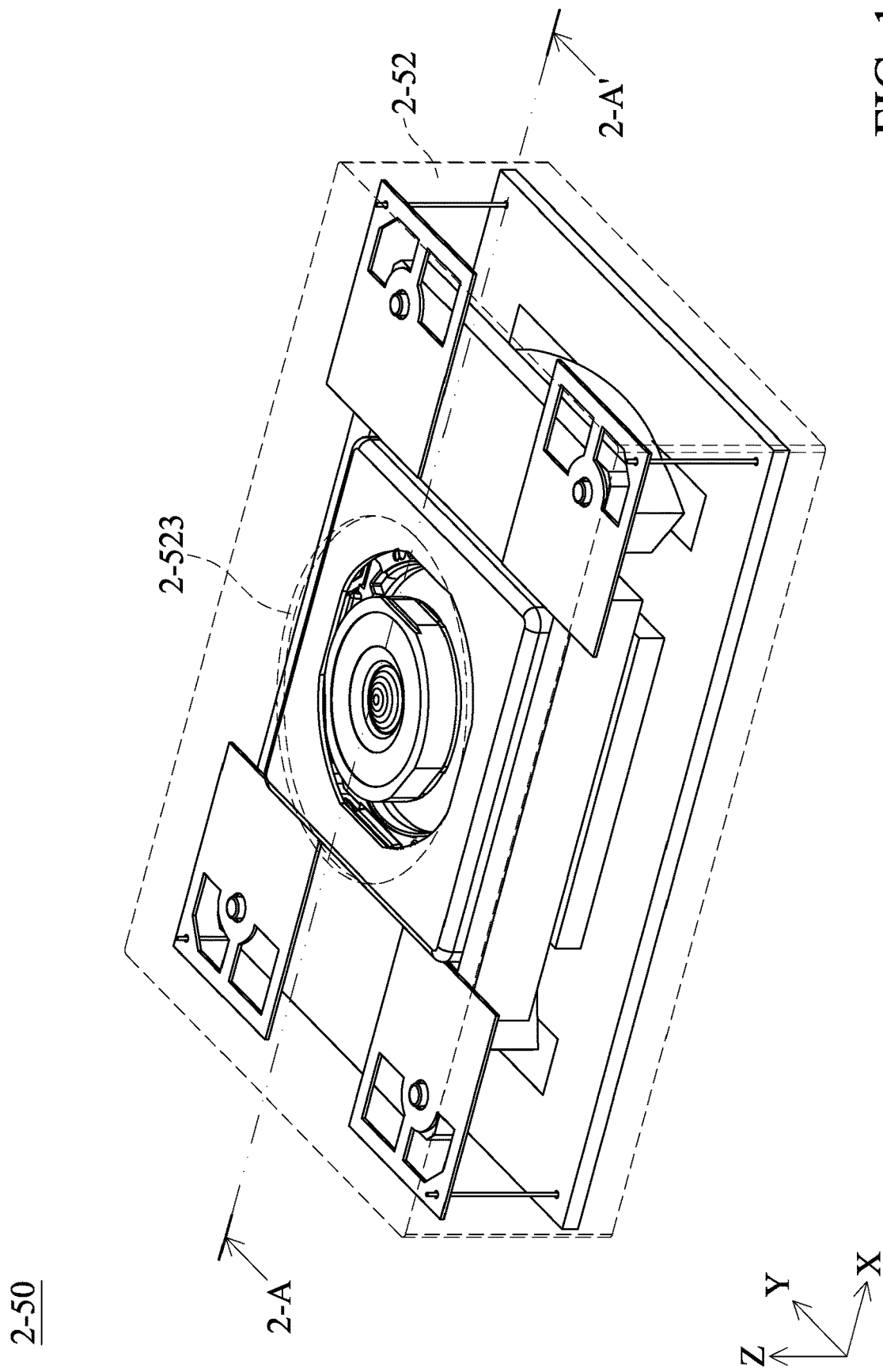
FIG. 10 shows a schematic diagram of an optical system 2-50 according to an embodiment of the present disclosure.
Figure 11:
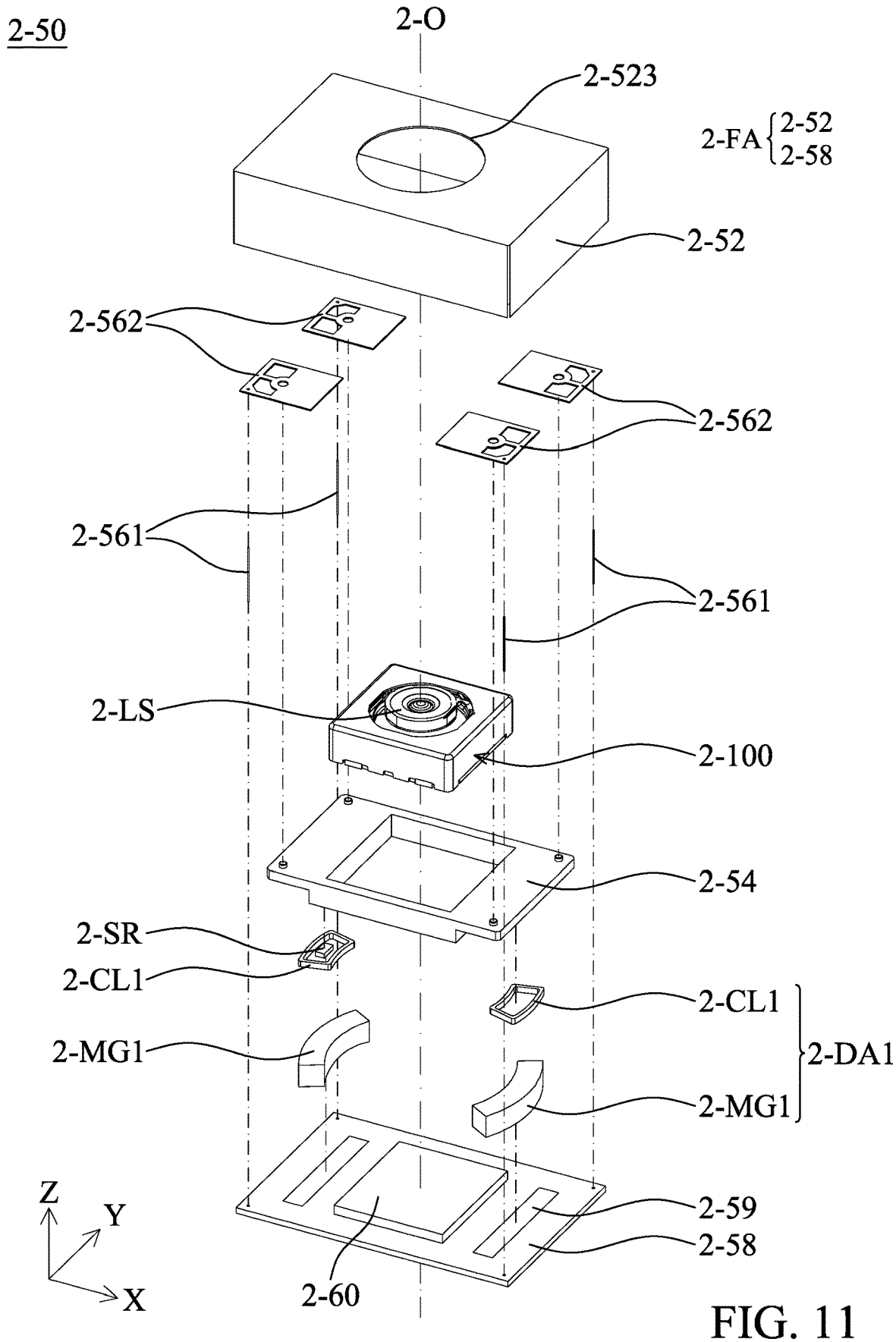
FIG. 11 shows an exploded diagram of the optical system 2-50 according to an embodiment of the present disclosure.
Figure 12:
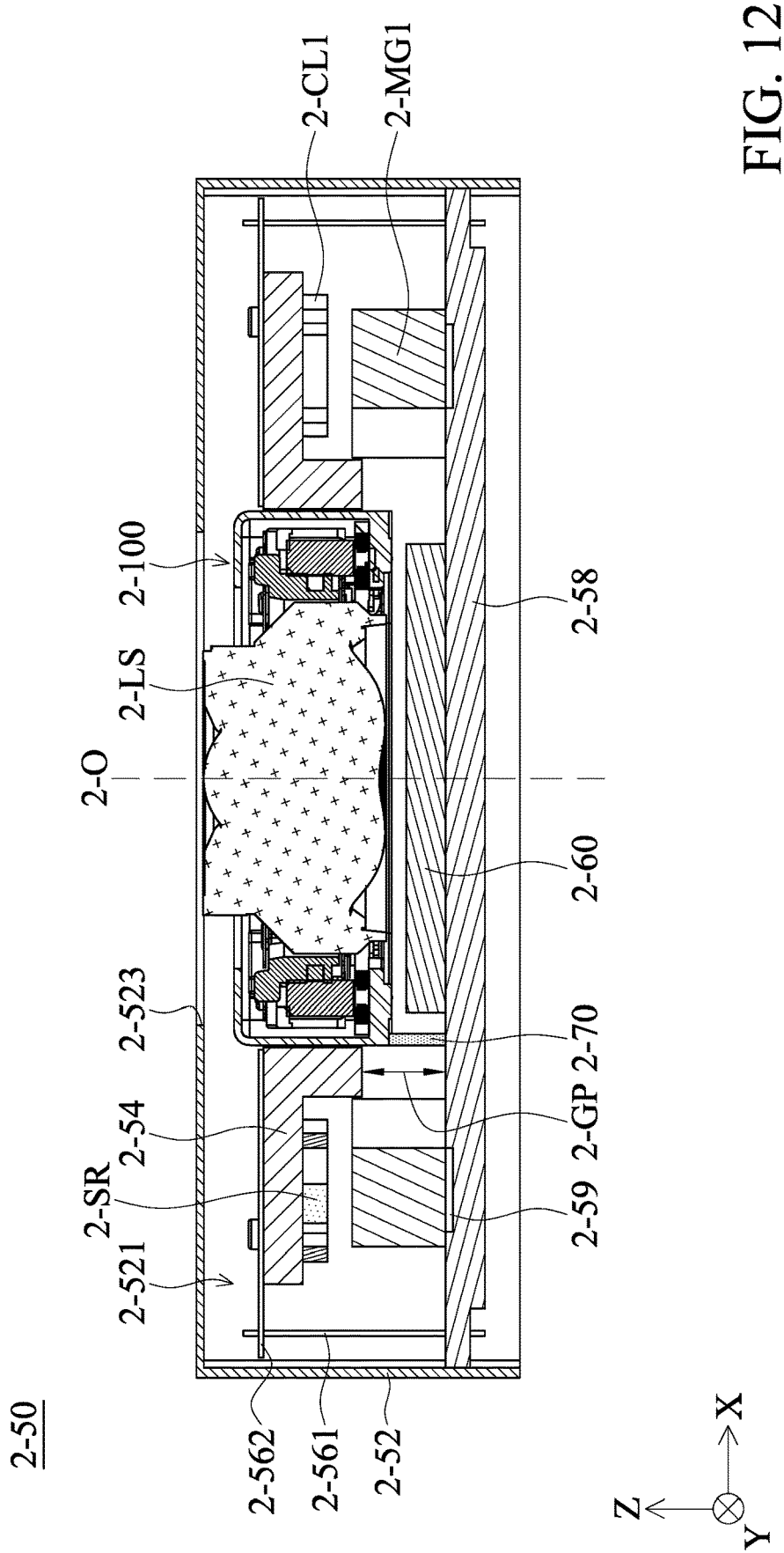
FIG. 12 shows a cross-sectional view along line 2-A-2-A' in FIG. 10 according to an embodiment of the present disclosure.

Please refer to FIG. 10 to FIG. 12. FIG. 10 shows a schematic diagram of an optical system 2-50 according to an embodiment of the present disclosure, FIG. 11 shows an exploded diagram of the optical system 2-50 according to an embodiment of the present disclosure, and FIG. 12 shows a cross-sectional view along line 2-A-2-A' in FIG. 10 according to an embodiment of the present disclosure. The optical system 2-50 can be an optical camera system and can be configured to hold and drive optical element 2-LS. The optical system 2-50 can be installed in different electronic devices or portable electronic devices, such as a smartphone, for allowing a user to perform the image capturing function. In this embodiment, the optical system 2-50 can be a voice coil motor (VCM) with an auto-focusing (AF) function, but it is not limited thereto. In other embodiments, the optical system 2-50 can also perform the functions of auto-focusing and optical image stabilization (OIS).

In this embodiment, the optical system 2-50 may include a fixed assembly 2-FA, an optical module 2-100, a first movable assembly, and a first driving assembly 2-DA1. The first movable assembly is connected to the optical module 2-100 for holding the optical module 2-100, and an optical element 2-LS held by the optical module 2-100 has an optical axis 2-O. The first driving assembly 2-DA1 is configured to drive the first movable assembly to move relative to the fixed assembly 2-FA.

In this embodiment, as shown in FIG. 11, the fixed assembly 2-FA includes a casing 2-52 and a base 2-58. The casing 2-52 is fixedly connected to the base 2-58 to form an accommodating space 2-521 to accommodate other components of the optical system 2-50. The first movable assembly includes a supporting frame 2-54 configured to hold the optical module 2-100. In other embodiments, the first movable assembly may contain other elements.

As shown in FIG. 12, the casing 2-52 has a first opening 2-523, and the center of the first opening 2-523 corresponds to the optical axis 2-O of the optical module 2-100. The optical system 2-50 may further include a photosensitive element 2-60 disposed on the base 2-58, and the optical module 2-100 corresponds to the photosensitive element 2-60. The external light enters the casing 2-52 through the first opening 2-523, passes through the optical element 2-LS in the optical module 2-100, and then is received by the aforementioned photosensitive element 2-60 so as to generate a digital image signal.

In this embodiment, the optical system 2-50 may further include four first elastic elements 2-561 and four second elastic elements 2-562, the first elastic element 2-561 has a long strip-shaped structure, the second elastic element 2-562 has a plate-shaped structure, and the first movable assembly (the supporting frame 2-54) is movably connected to the base 2-58 via the first elastic elements 2-561 and the second elastic elements 2-562.

Specifically, inner portions of the second elastic elements 2-562 are fixed to the supporting frame 2-54, the first elastic elements 2-561 are connected between outer portions of the second elastic elements 2-562 and the base 2-58 so that the supporting frame 2-54 and the optical module 2-100 can be suspended in the accommodating space 2-521.

In this embodiment, the first driving assembly 2-DA1 may include at least one first driving magnet 2-MG1 and at least one first driving coil 2-CL1. The first driving coil 2-CL1 is disposed on the bottom of the supporting frame 2-54, and the first driving magnet 2-MG1 is disposed on the base 2-58 and faces the first driving coil 2-CL1. In other embodiments, the positions of the first driving coil 2-CL1 and the first driving magnet 2-MG1 may be interchanged.

It is worth noting that, as shown in FIG. 12, the first driving magnets 2-MG1 do not overlap and the first driving coils 2-CL1 when viewed in a direction perpendicular to the optical axis 2-O (such as in the Y-axis). In addition, there is a gap 2-GP between the supporting frame 2-54 and the base 2-58 for fixed assembly 2-FA.

Figure 13:
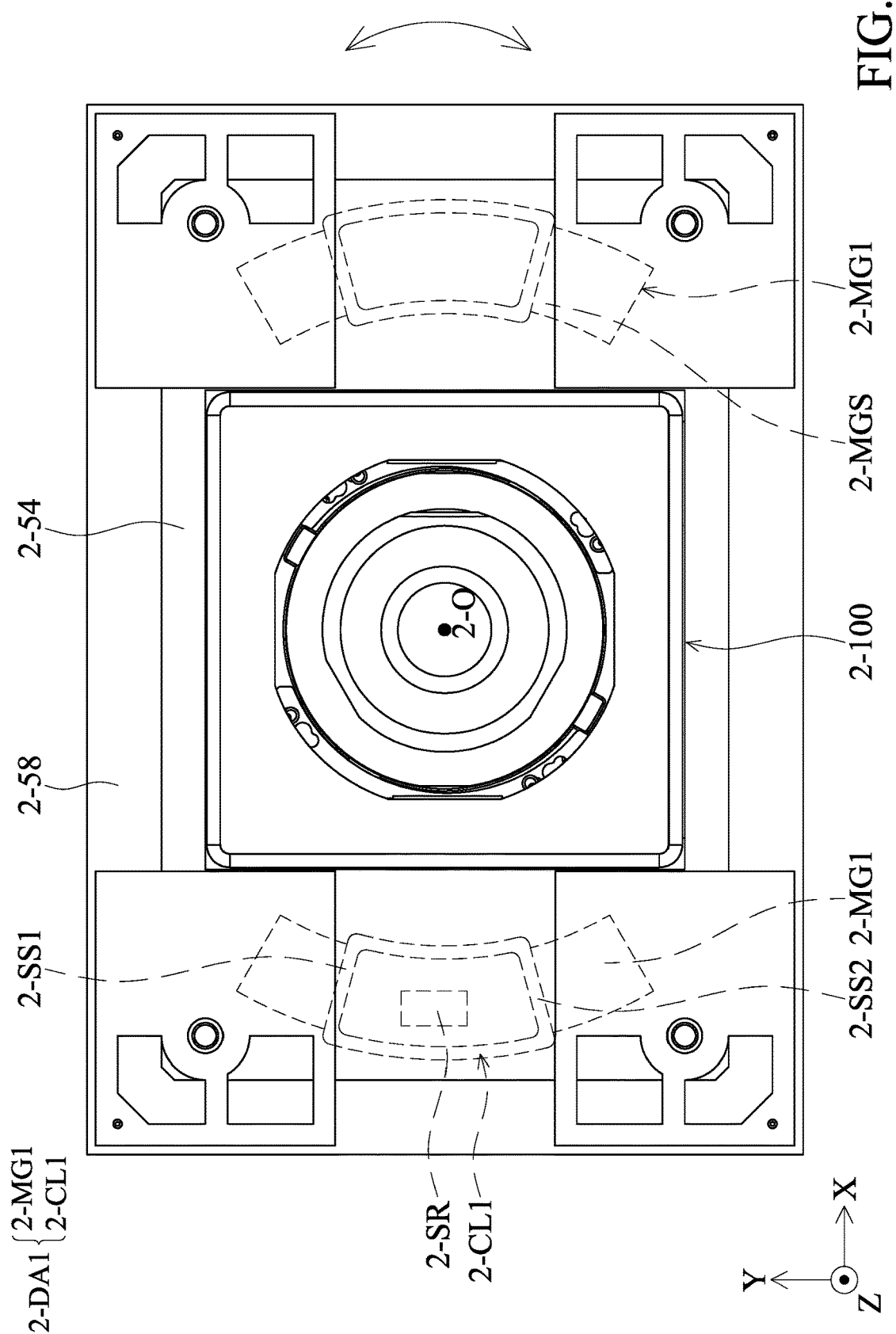
FIG. 13 is a top view of a partial structure of the optical system 2-50 according to an embodiment of the present disclosure.

Please refer to FIG. 12 and FIG. 13. FIG. 13 is a top view of a partial structure of the optical system 2-50 according to an embodiment of the present disclosure. In this embodiment, the first driving assembly 2-DA1 includes two first driving magnets 2-MG1, and when viewed along the optical axis 2-O, the two first driving magnets 2-MG1 are disposed on two opposite sides of the optical module 2-100. It should be noted that there is no first driving magnet 2-MG1 disposed on the other two sides (the upper and lower sides) of the optical module 2-100 so as to achieve the purpose of miniaturization.

The first driving coil 2-CL1 may be a winding coil having a first linear segment 2-SS1 and a second linear segment 2-SS2 with a linear structure, and the first linear segment 2-SS1 is neither parallel nor perpendicular to the second linear segment 2-SS2. The first driving magnet 2-MG1 has an arc-shaped surface 2-MGS, corresponding to the shape of the first driving coil 2-CL1.

When the first driving coils 2-CL1 are provided with electricity, they may act with the first driving magnets 2-MG1 to generate an electromagnetic driving force to drive the supporting frame 2-54 (the first movable assembly) and the optical module 2-100 to rotate around the optical axis 2-O or around a first axis parallel to the optical axis 2-O relative to the base 2-58 of the fixed assembly 2-FA. In addition, as shown in FIG. 12, two magnetic conductive elements 2-59 may be disposed on the base 2-58 to increase the driving ability of the first driving assembly 2-DA1.

As shown in FIG. 12, the optical system 2-50 may further include a circuit assembly 2-70 which has a plate-shaped structure and is electrically connected to the optical module 2-100. In addition, the circuit assembly 2-70 may also be connected to metal wires (not shown) in the base 2-58 so that the circuit assembly 2-70 is electrically connected to an external circuit. The circuit assembly 2-70 is a flexible circuit board, and a thickness direction (the X-axis) of the circuit assembly 2-70 is not parallel to the optical axis 2-O. Because the circuit assembly 2-70 is flexible, when the optical module 2-100 rotates around the optical axis 2-O, the circuit assembly 2-70 does not break.

The optical system 2-50 may further include a first position sensing assembly configured to sense the movement of the supporting frame 2-54 (the first movable assembly) relative to the fixed assembly 2-FA, and the first position sensing assembly can be electrically connected to the first elastic elements 2-561 and the second elastic elements 2-562. Specifically, as shown in FIG. 12, the first position sensing assembly includes a first position sensor 2-SR, which is fixedly disposed on the supporting frame 2-54 and configured to sense the change in the magnetic field of the first driving magnets 2-MG1 so as to obtain the position or angle of the supporting frame 2-54 relative to the base 2-58.

In some embodiments, the first position sensing assembly may further include an inertial sensor (not shown in the figures), and the optical system 2-50 may further include a control circuit (not shown in the figure) configured to control the first driving assembly 2-DA1 to drive the supporting frame 2-54 to move relative to the base 2-58 according to an image signal captured in advance by the optical system 2-50 or an inertial signal from the inertial sensor.

Figure 14:
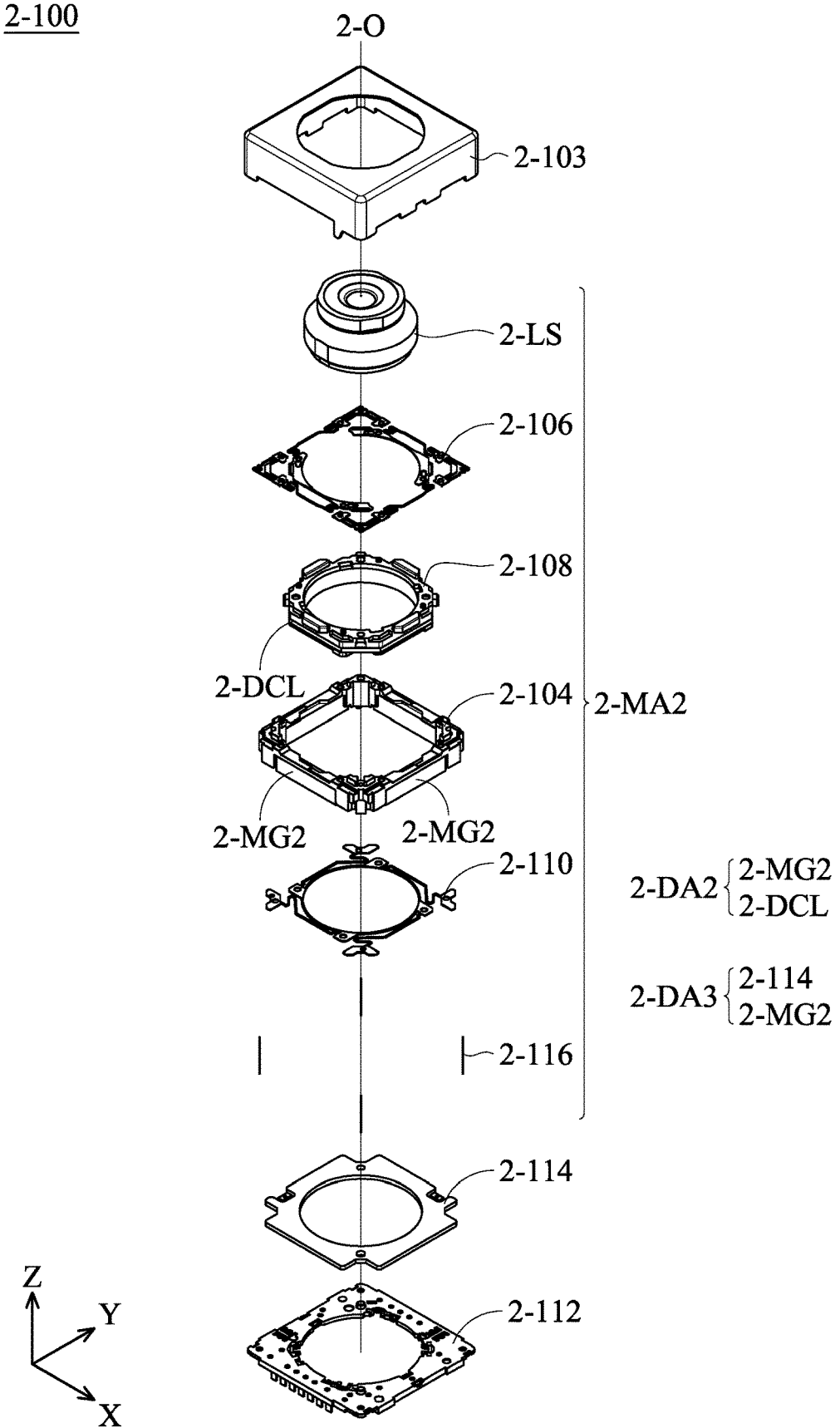
FIG. 14 is an exploded diagram of the optical module 100 according to an embodiment of the present disclosure.
Figure 15:
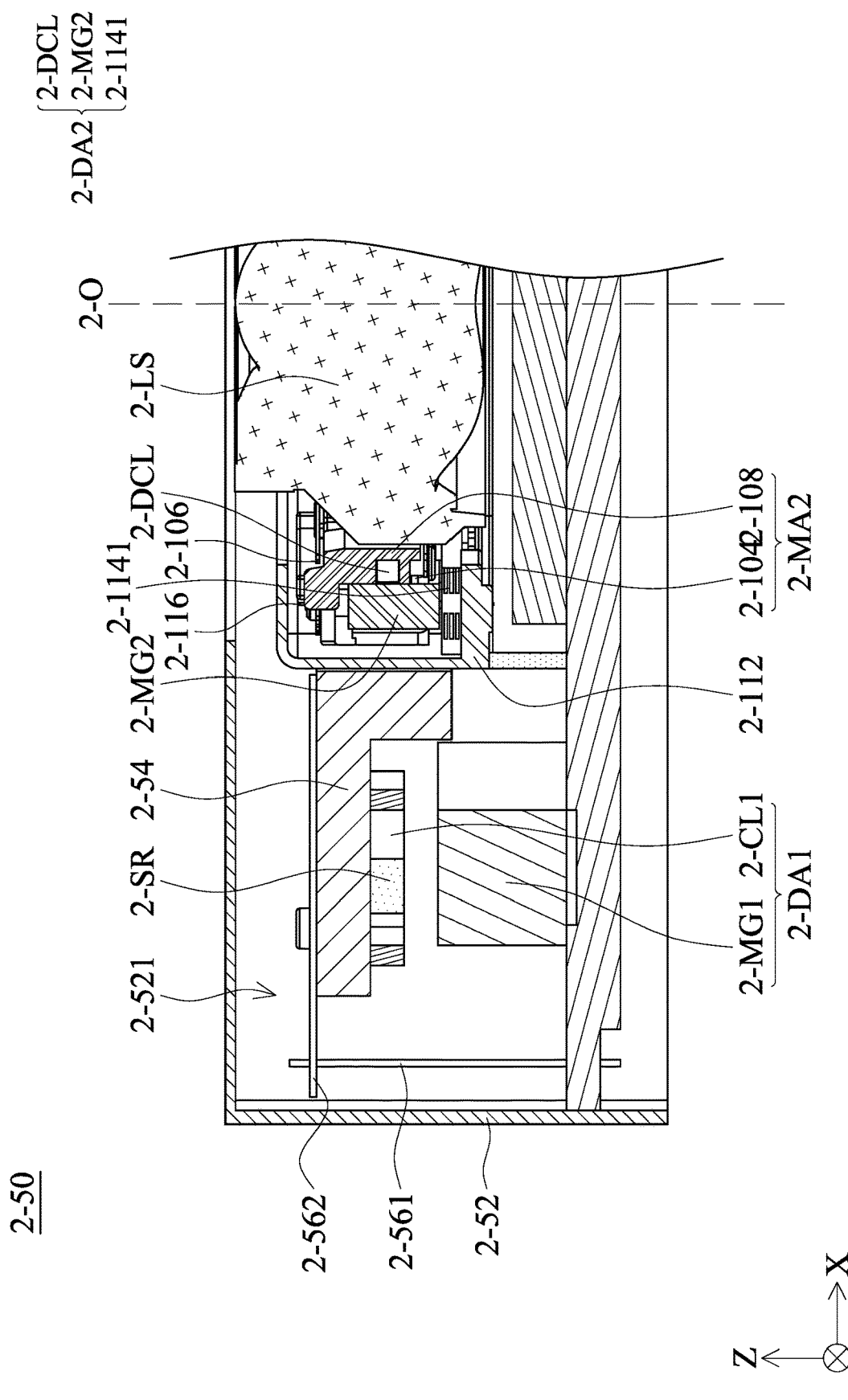
FIG. 15 is an enlarged schematic diagram of the optical system 2-50 according to an embodiment of the present disclosure.

Please refer to FIG. 14 and FIG. 15. FIG. 14 is an exploded diagram of the optical module 2-100 according to an embodiment of the present disclosure, and FIG. 15 is an enlarged schematic diagram of the optical system 2-50 according to an embodiment of the present disclosure.

As shown in FIG. 14 and FIG. 15, the optical module 2-100 includes a casing 2-103 fixedly connected to the base 2-112. In addition, the optical module 2-100 further includes a second movable assembly 2-MA2, a second driving assembly 2-DA2, and a third driving assembly 2-DA3. The second movable assembly 2-MA2 includes a frame 2-104, a holder 2-108, and fourth elastic elements 2-106 and 2-110. The second driving assembly 2-DA2 includes a second driving coil 2-DCL and a plurality of second driving magnets 2-MG2. The second driving magnets 2-MG2 are fixed on the frame 2-104, and the holder 2-108 is configured to hold an optical element 2-LS. The second driving assembly 2-DA2 is configured to drive the movement of the second movable assembly 2-MA2 relative to the first movable assembly and the fixed assembly 2-FA. For example, the second driving coil 2-DCL and the second driving magnets 2-MG2 in the second driving assembly 2-DA2 can generate an electromagnetic driving force to drive the holder 2-108 to move along the optical axis 2-O.

The outer ring portion of the fourth elastic element 2-106 is connected to the frame 2-104, the outer ring portion of the fourth elastic element 2-110 is connected to the base 2-112, and the inner ring portion of the fourth elastic element 2-106 and the inner ring portion of the fourth elastic element 2-110 are connected to the upper and lower sides of the holder 2-108 so that the holder 2-108 is suspended in the frame 2-104. In addition, the second movable assembly 2-MA2 further includes four suspension wires 2-116 (the third elastic elements), one end of the suspension wire 2-116 is connected to the fourth elastic element 2-106, and the other end is connected to the base 2-112, so that the frame 2-104 and the holder 2-108 can move in the X-axis or the Y-axis.

The third driving assembly 2-DA3 includes a circuit board 2-114 and second driving magnets 2-MG2, and the circuit board 2-114 has a third driving coil 2-1141, so that the third driving assembly 2-DA3 is configured to drive the second movable assembly 2-MA2 to move in the X-axis or the Y-axis relative to the base 2-112.

As shown in FIG. 15, the third elastic element (the suspension wire 2-116) has a long strip-shaped structure, and the fourth elastic element has a plate-shaped structure. The frame 2-104 and the holder 2-108 of the second movable assembly 2-MA2 are movably connected to the base 2-112 via the fourth elastic elements 2-106, 2-110 and the suspension wires 2-116, and the base 2-112 and the casing 2-103 are fixedly connected to the supporting frame 2-54 (the first movable assembly).

When viewed in a direction perpendicular to the optical axis 2-O (for example, the X-axis), the first driving assembly 2-DA1 overlaps at least one portion of the second driving assembly 2-DA2. When viewed along the optical axis 2-O, the first driving assembly 2-DA1 does not overlap the second driving assembly 2-DA2.

As shown in FIG. 15, the extending directions of the first elastic element 2-561 and the third elastic element (the suspension wires 2-116) are parallel. The extending directions of the first elastic element 2-561 and the second elastic element 2-562 are not parallel. The extending directions of the first elastic element 2-561 and the fourth elastic element 2-106 are not parallel. The extending directions of the second elastic element 2-562 and the third elastic element (the suspension wires 2-116) are not parallel. The extending directions of the second elastic element 2-562 and the fourth elastic element 2-106 are parallel. The extending direction of the third elastic element (the suspension wires 2-116) and the fourth elastic element 2-106 are not parallel.

In some embodiments of the present disclosure, the second driving assembly 2-DA2 is electrically connected to the first elastic element 2-561, the second elastic element 2-562, the third elastic element, and the fourth elastic element 2-106. For example, the second driving coil 2-DCL can be electrically connected to the metal pins (not shown in the figures) of the base 2-112 via the fourth elastic element 2-106 and the suspension wires 2-116. Electrical lines (not shown in the figure) may be formed on the supporting frame 2-54 by the laser direct structuring technology (LDS), and then the metal pins are electrically connected to the first elastic element 2-561 and the second elastic element 2-562 via the electrical lines.

In other embodiments, the first driving coil 2-CL1 of the first driving assembly 2-DA1 may also be electrically connected to the first elastic element 2-561 and the second elastic element 2-562 by the electrical lines on the supporting frame 2-54.

Figure 16:
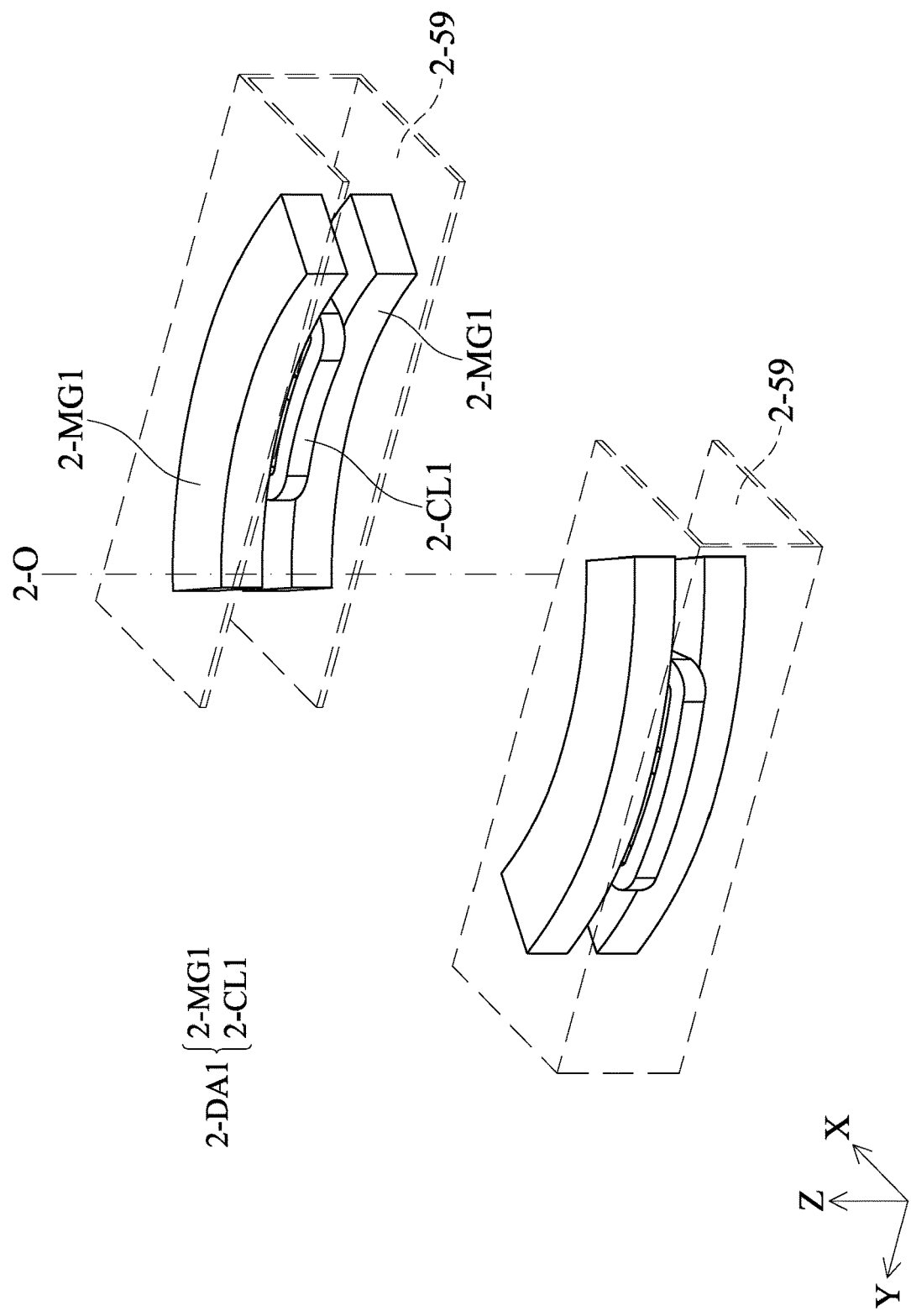
FIG. 16 is a schematic diagram of the first driving assembly 2-DA1 according to another embodiment of the present disclosure.

Please refer to FIG. 16, which is a schematic diagram of the first driving assembly 2-DA1 according to another embodiment of the present disclosure. As shown in FIG. 16, the first driving assembly 2-DA1 includes two sets of first driving magnets, and when viewed along the optical axis 2-O, the two sets of first driving magnets are respectively disposed on two opposite sides of the optical module 2-100. Furthermore, the first driving assembly 2-DA1 may include two magnetic conductive elements 2-59 with a U-shaped structure, and the two sets of first driving magnets are respectively disposed in the two magnetic conductive elements 2-59.

Each set of first driving magnets may include two first driving magnets 2-MG1, and the first driving coil 2-CL1 in the first driving assembly 2-DA1 is disposed between the two first driving magnets 2-MG1 along the Z-axis.

Figure 17:
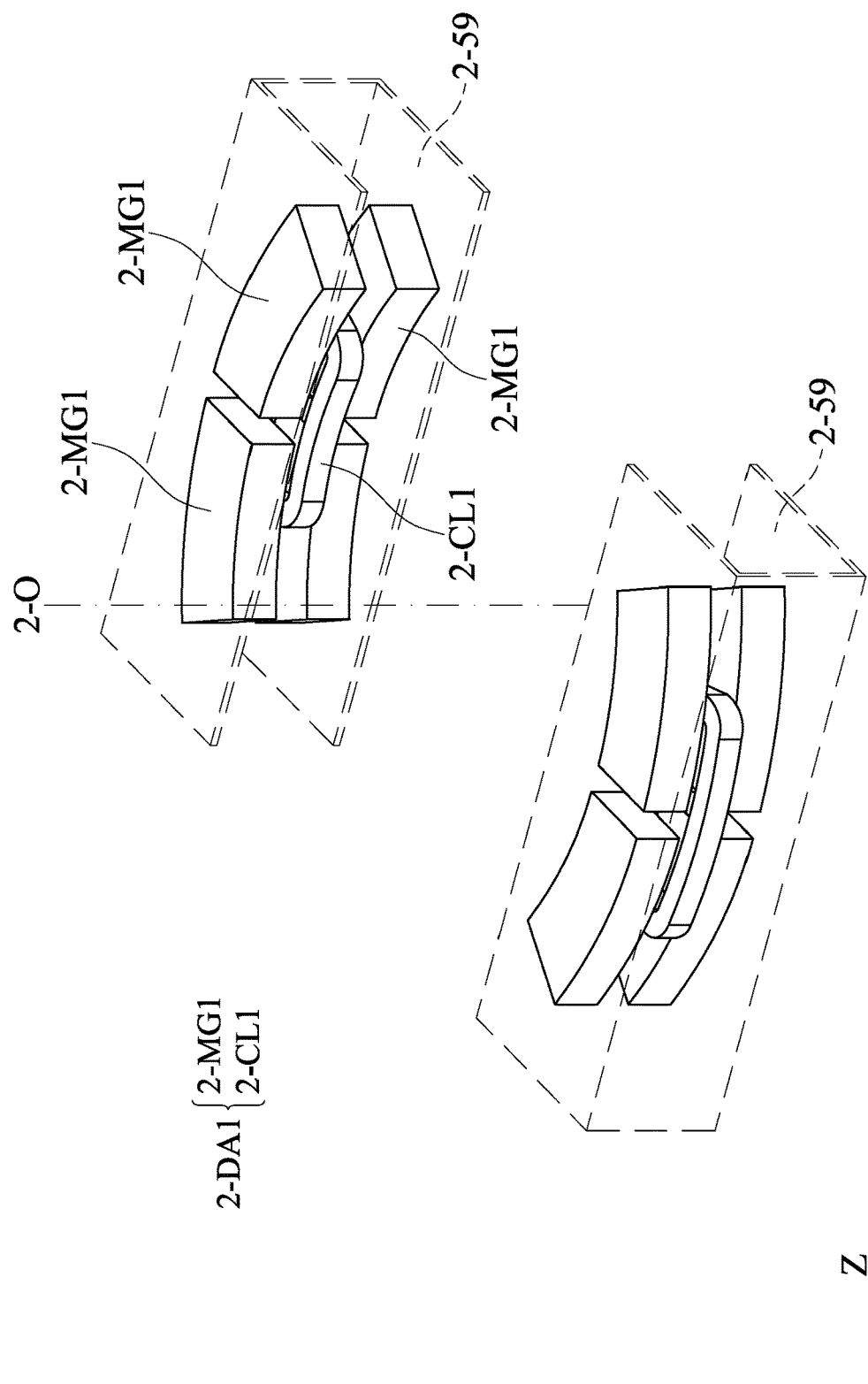
FIG. 17 is a schematic diagram of the first driving assembly 2-DA1 according to another embodiment of the present disclosure.

Please refer to FIG. 17, which is a schematic diagram of the first driving assembly 2-DA1 according to another embodiment of the present disclosure. As shown in FIG. 17, in this embodiment, two sets of first driving magnets are respectively disposed on two opposite sides of the optical module 2-100, and each set of first driving magnets may include four first driving magnets 2-MG1. Two of the first driving magnets 2-MG1 are disposed on one side of the first driving coil 2-CL1, and the other two of the first driving magnets 2-MG1 are disposed on the other side of the first driving coil 2-CL1.

The present disclosure provides an optical system disposed in an electronic device. The optical system includes the optical module 2-100, the supporting frame 2-54, the first elastic elements 2-561, the second elastic elements 2-562, the first driving assembly 2-DA1, and the base 2-58. The supporting frame 2-54 is configured to support the optical module 2-100, and the supporting frame 2-54 is movably connected to the base 2-58 via the first elastic elements 2-561 and the second elastic elements 2-562. When the user uses the electronic device to take pictures and the electronic device is not placed horizontally, the first driving assembly 2-DA1 can drive the supporting frame 2-54 with the optical module 2-100 to rotate around the optical axis 2-O, so as to achieve the purpose of image compensation.

In addition, the circuit assembly 2-70 of the present disclosure is a flexible circuit board, and the thickness direction of the circuit assembly 2-70 is not parallel to the optical axis 2-O. Because the circuit assembly 2-70 is flexible, when the optical module 2-100 rotates around the optical axis 2-O, the circuit assembly 2-70 does not break.

The Third Embodiment Group

Figure 18:
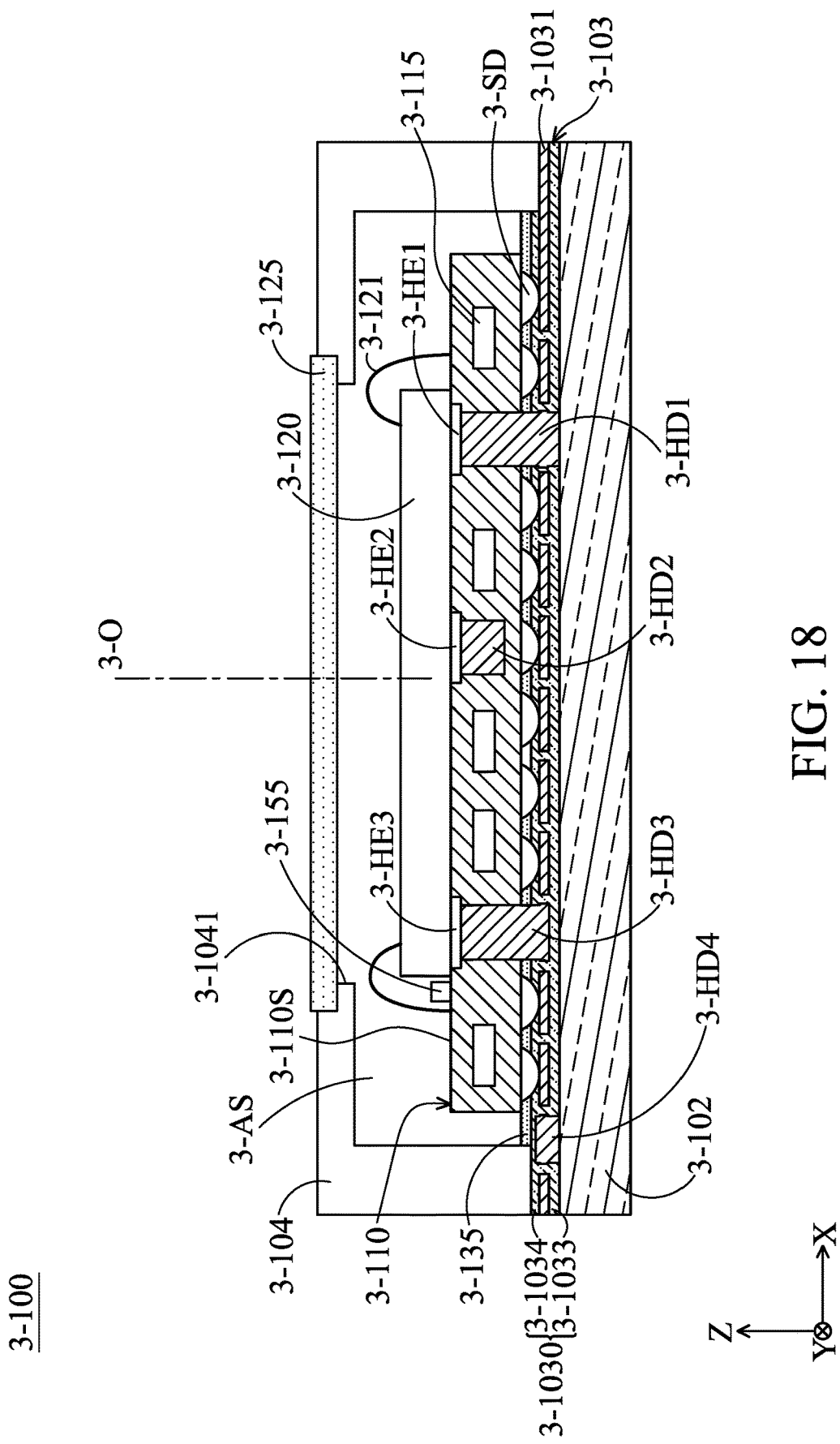
FIG. 18 is a schematic cross-sectional structure diagram of a photosensitive module 3-100 according to an embodiment of the present disclosure.

Please refer to FIG. 18, which is a schematic cross-sectional structure diagram of a photosensitive module 3-100 according to an embodiment of the present disclosure. The photosensitive module 3-100 can be installed in various electronic devices, such as a camera of a notebook computer, a camera lens of a tablet computer, or a camera lens of a smart phone. The photosensitive module 3-100 is configured to generate one or more digital image signals after receiving light outside the electronic device.

In this embodiment, as shown in FIG. 18, the photosensitive module 3-100 may include a base 3-102, a circuit assembly 3-103, a photosensitive element holding frame 3-104, an integrated package substrate 3-110, a photosensitive element 3-120, and a transparent element 3-125. The base 3-102 is configured to hold the circuit assembly 3-103, the integrated package substrate 3-110, and the photosensitive element 3-120. In this embodiment, the base 3-102 may be made of a metal material, but it is not limited thereto. Specifically, the base 3-102 may be made of a material with high thermal conductivity.

The circuit assembly 3-103 is fixedly disposed on the base 3-102, and the circuit assembly 3-103 may be a printed circuit board (PCB), but it is not limited thereto. The circuit assembly 3-103 may include an insulating structure layer 3-1030 and a plurality of circuit wires 3-1031, and the circuit wires 3-1031 are disposed in the insulating structure layer 3-1030. These circuit wires 3-1031 are configured to be electrically connected to the integrated package substrate 3-110 or external electronic components. The insulating structure layer 3-1030 may include a first insulating layer 3-1033 and a second insulating layer 3-1034, and the circuit wires 3-1031 are disposed between the first insulating layer 3-1033 and the second insulating layer 3-1034.

The photosensitive element holding frame 3-104 is fixedly disposed on the circuit assembly 3-103, for example, using glue or solder, and the photosensitive element holding frame 3-104 has an opening 3-1041 corresponding to the photosensitive element 3-120. The transparent element 3-125 is disposed on the photosensitive element holding frame 3-104 and covers the opening 3-1041 so as to form an enclosed accommodation space 3-AS for receiving the integrated package substrate 3-110 and the photosensitive element 3-120. The transparent element 3-125 can be an optical filter. For example, it can filter infrared light.

The integrated package substrate 3-110 is disposed on the circuit assembly 3-103, and the photosensitive module 3-100 further includes a plurality of electrical connection portions, and the electrical connection portion may be a solder 3-SD. The integrated package substrate 3-110 is electrically connected to the circuit assembly 3-103 via the solder 3-SD, for example, by the surface-mount technology (SMT). The surface-mount technology may be, for example, a ball grid array (BGA) packaging technology. As shown in FIG. 18, the integrated package substrate 3-110 is connected to the circuit wires 3-1031 through the plurality of solder 3-SD.

Furthermore, the photosensitive module 3-100 may further include a reinforcing material 3-135, which is in direct contact with the electrical connection portion (the solder 3-SD), the integrated package substrate 3-110, and the circuit assembly 3-103. The reinforcing material 3-135 may be a non-conductive adhesive or a head conductive glue, but it is not limited thereto. In some embodiments, the reinforcing material 3-135 and the second insulating layer 3-1034 may be integrally formed. For example, they may be made of a polymer.

The integrated package substrate 3-110 may be a semiconductor embedded substrate (SESUB), but it is not limited thereto. The integrated package substrate 3-110 may have a plurality of first electronic components 3-115, and these first electronic components 3-115 may be various electronic components, such as integrated circuit (IC) chips, capacitors, resistors, sensors, and so on. It should be noted that the first electronic components 3-115 are housed in the body of the integrated package substrate 3-110 without being exposed to external environment.

The photosensitive element 3-120 is disposed on the integrated package substrate 3-110 and is electrically connected to the integrated package substrate 3-110 by a plurality of lead wires 3-121. The photosensitive element 3-120 is configured to receive a light beam traveling along the optical axis 3-O so as to generate a digital image signal.

The photosensitive module 3-100 may include multiple heat dissipation structures and head conductive elements, corresponding to the photosensitive element 3-120 or the integrated package substrate 3-110. The heat conductive element may include an adhesive material with a high thermal conductivity coefficient (such as silver glue or aluminum nitride, etc.), and the heat dissipation structure may have a metal material. As shown in FIG. 18, a first heat conductive element 3-HE1 is disposed on the bottom of the photosensitive element 3-120, and a first heat dissipation structure 3-HD1 is connected to the first heat conductive element 3-HE1 and the base 3-102. Specifically, the first heat dissipation structure 3-HD1 penetrates the integrated package substrate 3-110, the reinforcing material 3-135, and the circuit assembly 3-103 to be connected to the base 3-102, and the first heat dissipation structure 3-HD1 is electrically independent of the integrated package substrate 3-110.

As shown in FIG. 18, a second heat dissipation structure 3-HD2 is connected to a second heat conductive element 3-HE2, the second heat dissipation structure 3-HD2 is embedded in the integrated package substrate 3-110, and the second heat dissipation structure 3-HD2 does not penetrate the integrated package substrate 3-110. A third heat dissipation structure 3-HD3 is connected to a third heat conductive element 3-HE3 and the circuit assembly 3-103, and the third heat dissipation structure 3-HD3 does not penetrate the circuit assembly 3-103. In addition, a fourth heat dissipation structure 3-HD4 is embedded in the circuit assembly 3-103, and based on the configuration of the insulating structure layer 3-1030, the fourth heat dissipation structure 3-HD4 is electrically independent of the circuit wires 3-1031.

Based on the configuration of above-mentioned heat dissipation structures and the heat conductive element, the heat dissipation efficiency of the photosensitive element 3-120 can be improved, so that the stability of the digital image signal generated by the photosensitive element 3-120 can also be improved.

It is worth noting that the above heat dissipation structures are electrically independent of the circuit wires 3-1031. In addition, in some embodiments, the heat conductive elements can be omitted, which means that the photosensitive element 3-120 can be connected to the base 3-102 through the first heat dissipation structure 3-HD1. Furthermore, the integrated package substrate 3-110 is connected to the base 3-102 through the first heat dissipation structure 3-HD1 as well.

Figure 19:
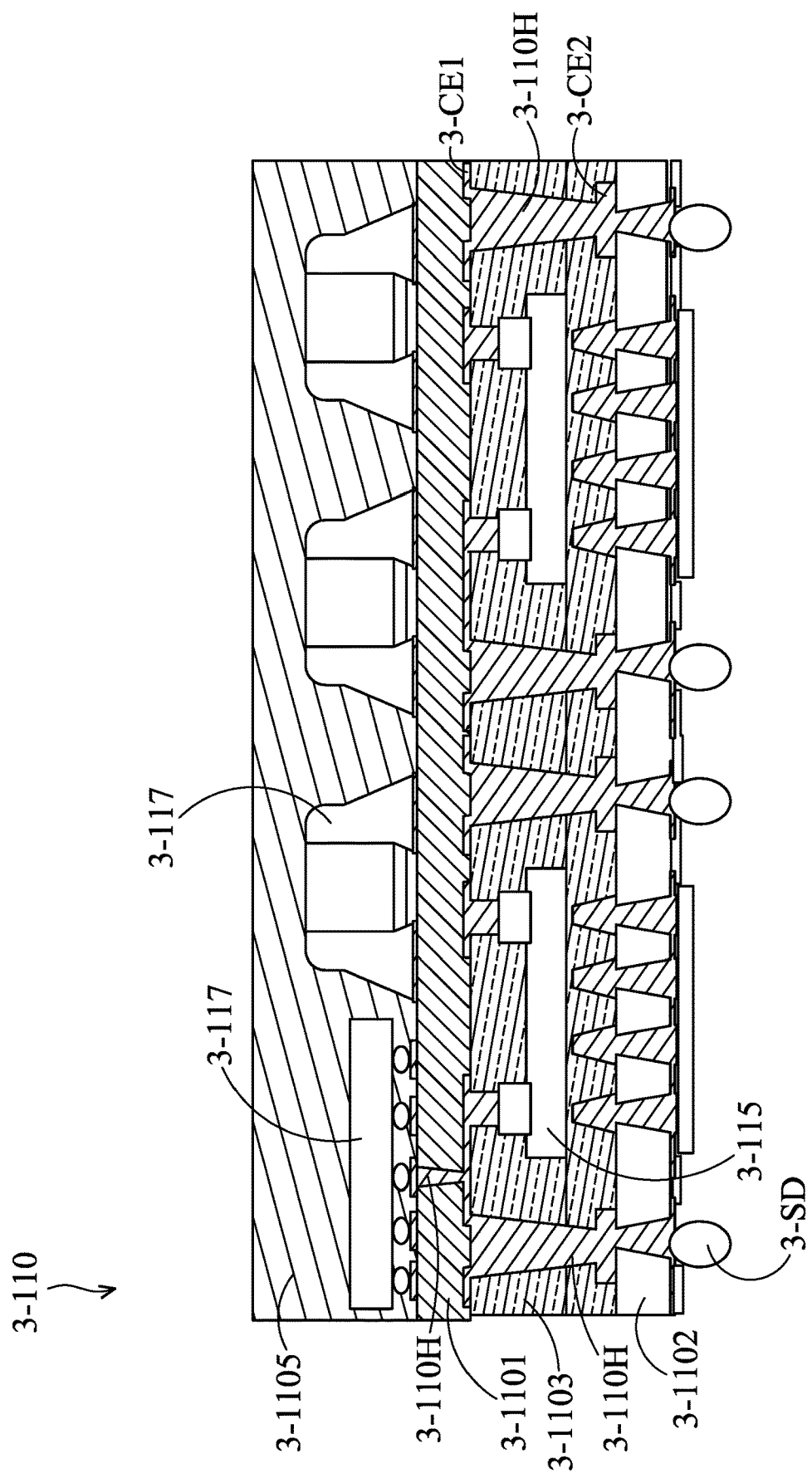
FIG. 19 is an enlarged structural diagram of the integrated package substrate 3-110 according to some embodiments of the present disclosure.

Next, please refer to FIG. 19, which is an enlarged structural diagram of the integrated package substrate 3-110 according to some embodiments of the present disclosure. In this embodiment, the integrated package substrate 3-110 includes a third insulating layer 3-1101, a fourth insulating layer 3-1102, an intermediate layer 3-1103, a first circuit element 3-CE1, and a second circuit element 3-CE2.

The intermediate layer 3-1103 is disposed between the third insulating layer 3-1101 and the fourth insulating layer 3-1102, and the first electronic component 3-115 is disposed in the intermediate layer 3-1103. The first circuit element 3-CE1 is disposed between the third insulating layer 3-1101 and the intermediate layer 3-1103, the second circuit element 3-CE2 is disposed between the intermediate layer 3-1103 and the fourth insulating layer 3-1102, and the intermediate layer 3-1103 is made of a material different from that of the third insulating layer 3-1101 or the fourth insulating layer 3-1102. For example, the material of the intermediate layer 3-1103 is softer than the materials of the third insulating layer 3-1101 and the fourth insulating layer 3-1102.

The first circuit element 3-CE1 and the second circuit element 3-CE2 may be metal pads, which are connected to each other by the through hole 3-110H. In addition, a plurality of electronic units 3-117 (such as integrated circuit wafers) may be disposed on the third insulating layer 3-1101, and the integrated package substrate 3-110 further includes a packaging layer 3-1105 to cover the electronic units 3-117 to prevent them from exposure. The electronic units 3-117 may be electrically connected to the solder 3-SD through the plurality of through holes 3-110H, the first circuit element 3-CE1 and the second circuit element 3-CE2.

Please return to FIG. 18 again. In this embodiment, the photosensitive module 3-100 further includes a second electronic component 3-155 disposed on a surface 3-110S of the integrated package substrate 3-110. It is worth noting that the second electronic component 3-155 and the photosensitive element 3-120 are disposed on the same side of the integrated package substrate 3-110.

Figure 20:
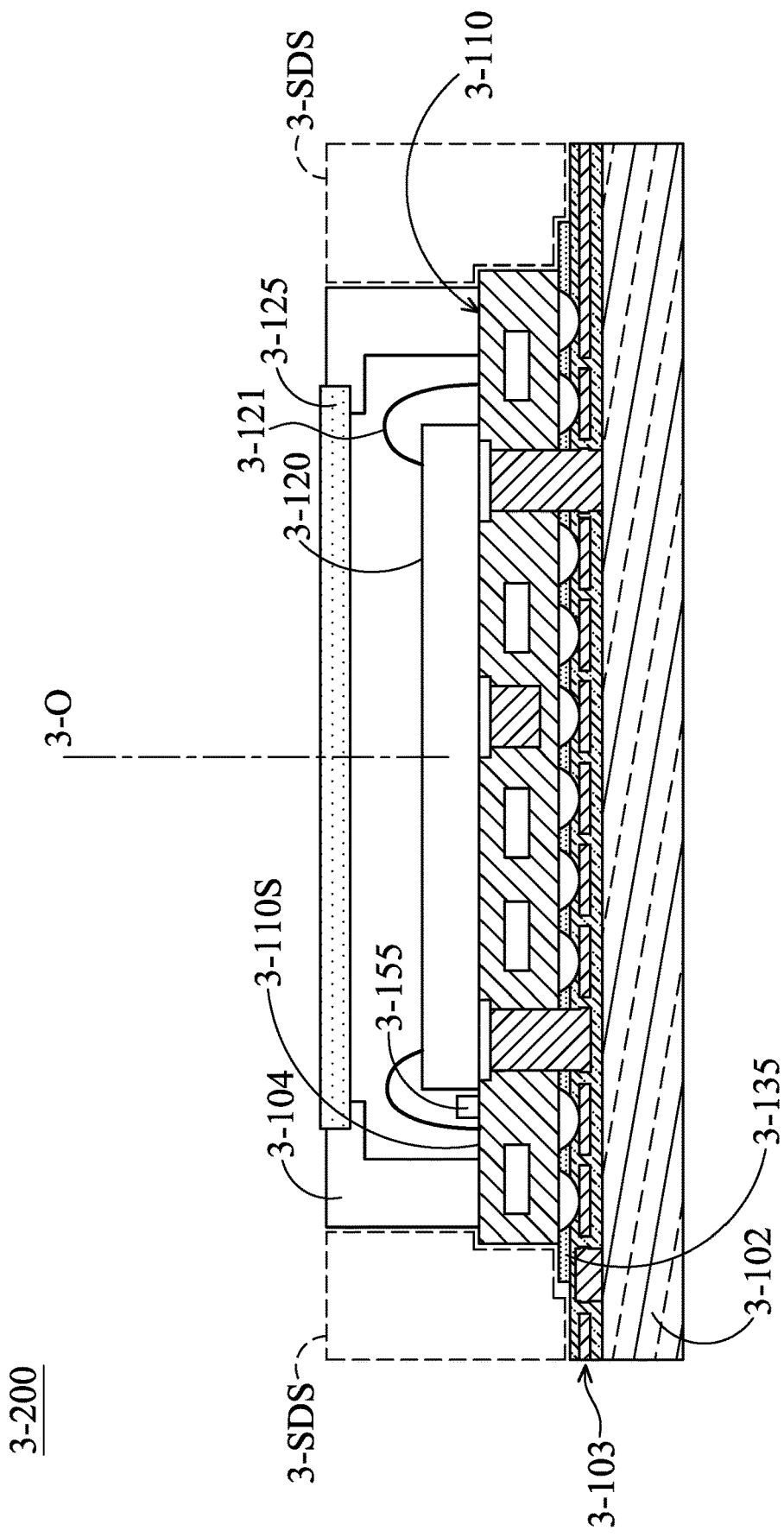
FIG. 20 is a schematic cross-sectional structure diagram of a photosensitive module 3-200 according to another embodiment of the present disclosure.

Please refer to FIG. 20, which is a schematic cross-sectional structure diagram of a photosensitive module 3-200 according to another embodiment of the present disclosure. The structure of the photosensitive module 3-200 is similar to that of the photosensitive module 3-100, and the same components will not be described repeat herein. In this embodiment, the photosensitive element holding frame 3-104 is disposed on the surface 3-110S of the integrated package substrate 3-110.

Based on the above structural configuration, the amount of usable space of the sensitive module 3-200 can be increased. For example, as shown in FIG. 20, when the photosensitive module 3-200 is connected to a camera lens driving mechanism (not shown in the figures), at least one side space 3-SDS around the photosensitive element holding frame 3-104 can be used to dispose components of the camera lens driving mechanism so as to improve the space utilization rate.

Figure 21:
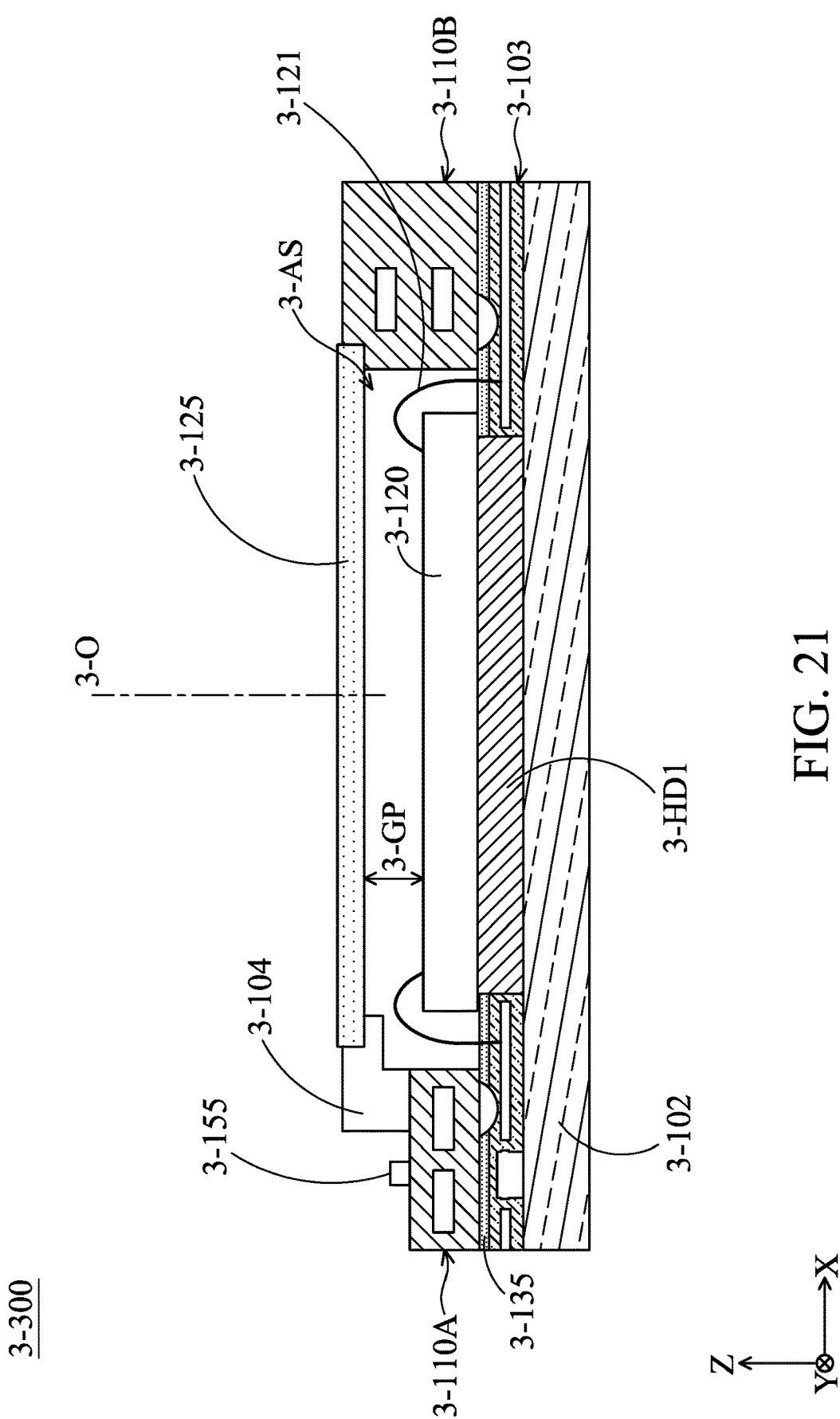
FIG. 21 is a schematic cross-sectional structure diagram of a photosensitive module 3-300 according to another embodiment of the present disclosure.

Please refer to FIG. 21, which is a schematic cross-sectional structure diagram of a photosensitive module 3-300 according to another embodiment of the present disclosure. In this embodiment, the photosensitive module 3-300 includes a first integrated package substrate 3-110A and a second integrated package substrate 3-110B, which are disposed on opposite sides of the photosensitive element 3-120.

The photosensitive element holding frame 3-104 is directly disposed on the first integrated package substrate 3-110A and is connected to one end of the transparent element 3-125, and the other end of the transparent element 3-125 is disposed on the second integrated package substrate 3-110B. That is, the transparent element 3-125 is connected between the photosensitive element holding frame 3-104 and the second integrated package substrate 3-110B.

In this embodiment, a gap 3-GP formed between the transparent element 3-125 and the photosensitive element 3-120. Specifically, the first integrated package substrate 3-110A, the second integrated package substrate 3-110B, the photosensitive element holding frame 3-104 and the transparent element 3-125 form an enclosed accommodation space 3-AS, and the photosensitive element 3-120 is disposed in the accommodation space 3-AS.

When viewed in a direction perpendicular to the optical axis 3-O (for example, along the X-axis), the photosensitive element 3-120 is located between the photosensitive element holding frame 3-104 and the second integrated package substrate 3-110B. When viewed along the direction perpendicular to the optical axis 3-O (for example, the X-axis), at least a portion of the photosensitive element 3-120 overlaps the first integrated package substrate 3-110A or the second integrated package substrate 3-110B. Furthermore, when viewed along the direction perpendicular to the optical axis 3-O, at least a portion of the second integrated package substrate 3-110B overlaps the transparent element 3-125 and the photosensitive element 3-120.

In addition, as shown in FIG. 21, the photosensitive module 3-300 includes a heat dissipation structure (the first heat dissipation structure 3-HD1), which is in direct contact with the photosensitive element 3-120 and base 3-102, and when viewed along the optical axis 3-O, the area of the first heat dissipation structure HD1 is slightly smaller than or equal to the area of the photosensitive element 3-120. For example, the area of the first heat dissipation structure 3-HD1 may be 80 to 100% of that of the photosensitive element 3-120, so that the efficiency of heat dissipation of the photosensitive element 3-120 may be increased.

Figure 22:
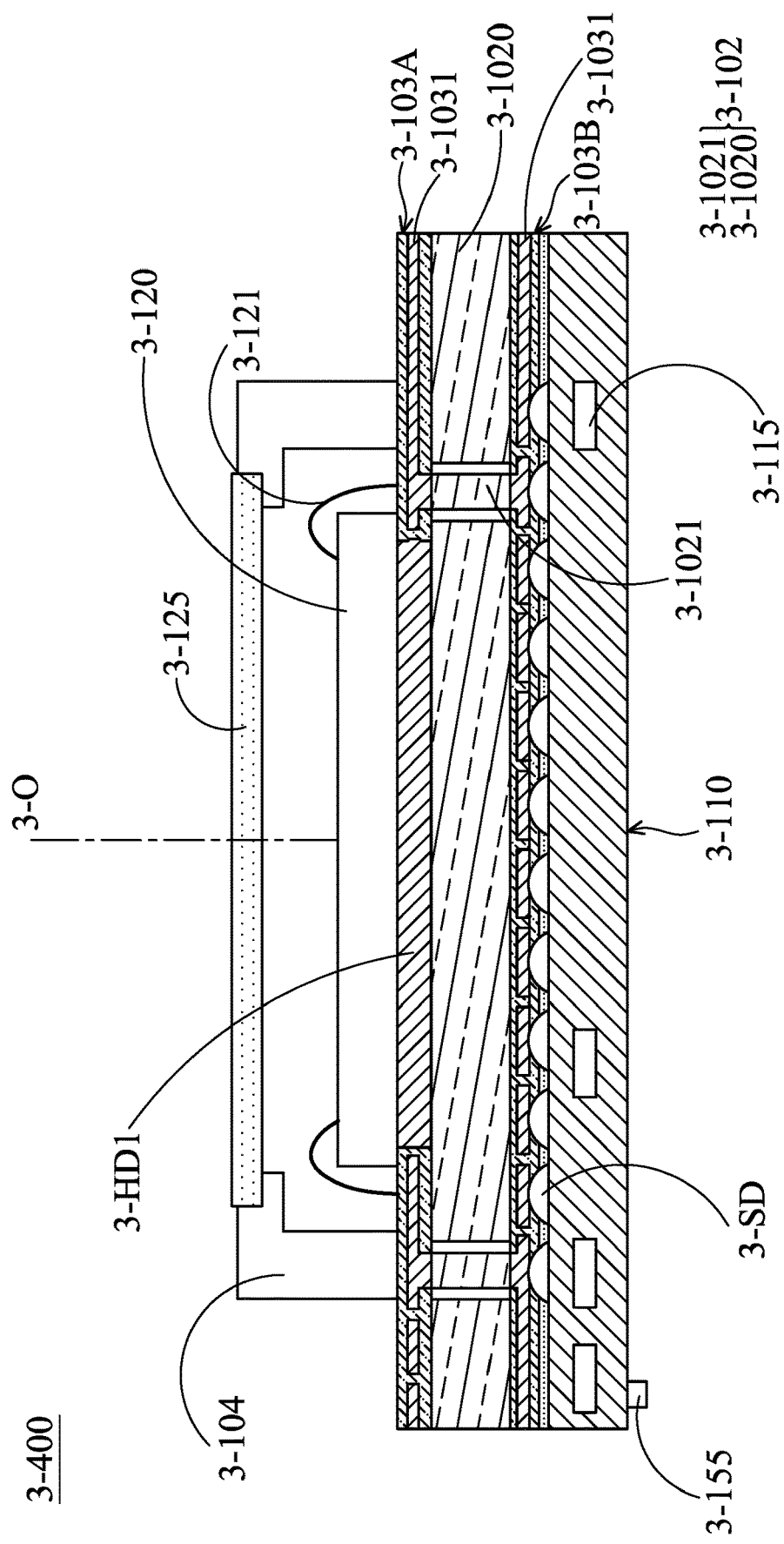
FIG. 22 is a schematic cross-sectional structure diagram of a photosensitive module 3-400 according to another embodiment of the present disclosure.

Please refer to FIG. 22, which is a schematic cross-sectional structure diagram of a photosensitive module 3-400 according to another embodiment of the present disclosure. In this embodiment, the integrated package substrate 3-110 and the photosensitive element 3-120 are respectively disposed on opposite sides of the base 3-102. Furthermore, the second electronic component 3-155 and the photosensitive element 3-120 are respectively disposed on different sides of the integrated package substrate 3-110.

In this embodiment, the photosensitive module 3-400 includes two circuit assemblies (the circuit assemblies 3-103A, 3-103B), which are disposed on opposite sides of the base 3-102. The photosensitive element 3-120 is disposed on the circuit assembly 3-103A, and the integrated package substrate 3-110 is disposed on the bottom of the circuit assembly 3-103B.

In this embodiment, the photosensitive element 3-120 is electrically connected to the integrated package substrate 3-110 via the base 3-102. Specifically, the base 3-102 further includes a body 3-1020 and at least one electrical connection assembly 3-1021, and the photosensitive element 3-120 is electrically connected to the integrated package substrate 3-110 through the circuit assembly 3-103A, the electrical connection assembly 3-1021, and the circuit assembly 3-103B.

It is worth noting that the electrical connection assembly 3-1021 penetrates the body 3-1020 of the base 3-102, and the electrical connection assembly 3-1021 is electrically independent of the body 3-1020 of the base 3-102. In addition, when viewed along the direction perpendicular to the optical axis 3-O (for example, the X-axis), the base 3-102, the integrated package substrate 3-110, and the photosensitive element 3-120 do not overlap each other.

Similar to the photosensitive module 3-300, the first heat dissipation structure 3-HD1 of the photosensitive module 3-400 also is in direct contact with the photosensitive element 3-120 and the base 3-102, and when viewed along the optical axis 3-O, the area of the first heat dissipation structure 3-HD1 is less than or equal to the area of the photosensitive element 3-120.

The present disclosure provides a photosensitive module that can be installed in various electronic devices. The photosensitive module may include a base 3-102, a circuit assembly 3-103, an integrated package substrate 3-110, and a photosensitive element 3-120. The photosensitive element 3-120 can be electrically connected to the circuit assembly 3-103 or the integrated package substrate 3-110. The integrated package substrate 3-110 may be a semiconductor embedded substrate (SESUB), which has a plurality of electronic components, and those electronic components are enclosed in the integrated package substrate 3-110 without being exposed to external environment. Based on the configuration of the integrated package substrate 3-110, the photosensitive module can be equipped with more electronic components and can have a smaller volume at the same time.

The base 3-102 may be made of a material with high thermal conductivity coefficient to improve the overall heat dissipation effect of the photosensitive module. Furthermore, in some embodiments, the photosensitive module may further include a plurality of heat dissipation structures connected to the photosensitive element 3-120. The configuration of the heat dissipation structure can improve the heat dissipation efficiency of the photosensitive module.

The Fourth Embodiment Group

Figure 23:
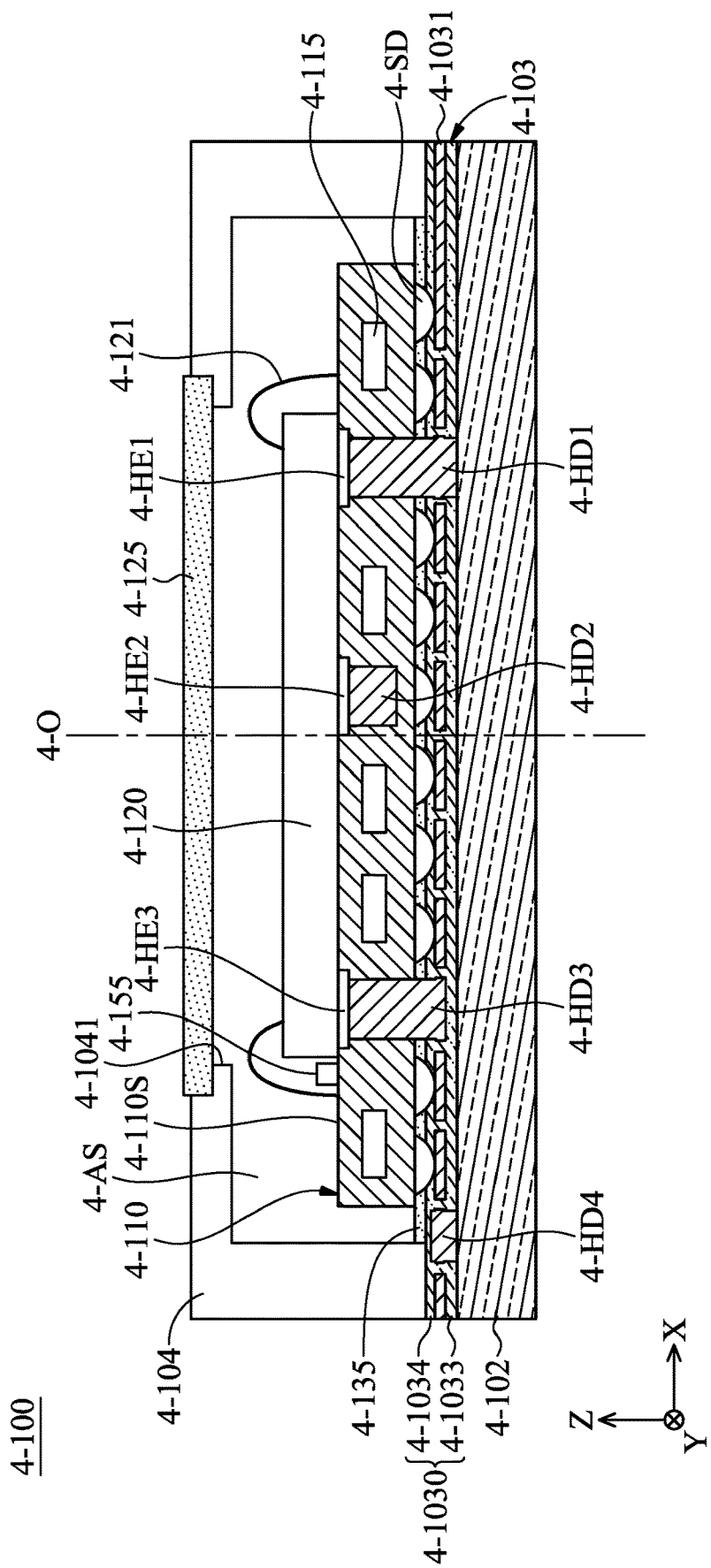
FIG. 23 is a schematic cross-sectional structure diagram of a photosensitive module 4-100 according to an embodiment of the present disclosure.

Please refer to FIG. 23, which is a schematic cross-sectional structure diagram of a photosensitive module 4-100 according to an embodiment of the present disclosure. The photosensitive module 4-100 can be installed in various electronic devices, such as a camera of a notebook computer, a camera lens of a tablet computer, or a camera lens of a smart phone. The photosensitive module 4-100 is configured to generate one or more digital image signals after receiving light outside the electronic device.

In this embodiment, as shown in FIG. 23, the photosensitive module 4-100 may include a base 4-102, a circuit assembly 4-103, a photosensitive element holding frame 4-104, an integrated package substrate 4-110, a photosensitive element 4-120, and a transparent element 4-125. The base 4-102 is configured to hold the circuit assembly 4-103, the integrated package substrate 4-110, and the photosensitive element 4-120. In this embodiment, the base 4-102 may be made of a metal material, but it is not limited thereto. Specifically, the base 4-102 may be made of a material with high thermal conductivity.

The circuit assembly 4-103 is fixedly disposed on the base 4-102, and the circuit assembly 4-103 may be a printed circuit board (PCB), but it is not limited thereto. The circuit assembly 4-103 may include an insulating structure layer 4-1030 and a plurality of circuit wires 4-1031, and the circuit wires 4-1031 are disposed in the insulating structure layer 4-1030. These circuit wires 4-1031 are configured to be electrically connected to the integrated package substrate 4-110 or external electronic components. The insulating structure layer 4-1030 may include a first insulating layer 4-1033 and a second insulating layer 4-1034, and the circuit wires 4-1031 are disposed between the first insulating layer 4-1033 and the second insulating layer 4-1034.

The photosensitive element holding frame 4-104 is fixedly disposed on the circuit assembly 4-103, for example, using glue or solder, and the photosensitive element holding frame 4-104 has an opening 4-1041 corresponding to the photosensitive element 4-120. The transparent element 4-125 is disposed on the photosensitive element holding frame 4-104 and covers the opening 4-1041 so as to form an enclosed accommodation space AS for receiving the integrated package substrate 4-110 and the photosensitive element 4-120. The transparent element 4-125 can be an optical filter. For example, it can filter infrared light.

The integrated package substrate 4-110 is disposed on the circuit assembly 4-103, and the photosensitive module 4-100 further includes a plurality of electrical connection portions, and the electrical connection portion may be a solder 4-SD. The integrated package substrate 4-110 is electrically connected to the circuit assembly 4-103 via the solder 4-SD, for example, by the surface-mount technology (SMT). The surface-mount technology may be, for example, a ball grid array (BGA) packaging technology. As shown in FIG. 23, the integrated package substrate 4-110 is connected to the circuit wires 4-1031 through the plurality of solder 4-SD.

Furthermore, the photosensitive module 4-100 may further include a reinforcing material 4-135, which is in direct contact with the electrical connection portion (the solder 4-SD), the integrated package substrate 4-110, and the circuit assembly 4-103. The reinforcing material 4-135 may be a non-conductive adhesive or a head conductive glue, but it is not limited thereto. In some embodiments, the reinforcing material 4-135 and the second insulating layer 4-1034 may be integrally formed. For example, they may be made of a polymer.

The integrated package substrate 4-110 may be a semiconductor embedded substrate (SESUB), but it is not limited thereto. The integrated package substrate 4-110 may have a plurality of first electronic components 4-115, and these first electronic components 4-115 may be various electronic components, such as integrated circuit (IC) chips, capacitors, resistors, sensors, and so on. It should be noted that the first electronic components 4-115 are housed in the body of the integrated package substrate 4-110 without being exposed to external environment.

The photosensitive element 4-120 is disposed on the integrated package substrate 4-110 and is electrically connected to the integrated package substrate 4-110 by a plurality of lead wires 4-121. The photosensitive element 4-120 is configured to receive a light beam traveling along the optical axis 4-O so as to generate a digital image signal.

The photosensitive module 4-100 may include multiple heat dissipation structures and head conductive elements, corresponding to the photosensitive element 4-120 or the integrated package substrate 4-110. The heat conductive element may include an adhesive material with a high thermal conductivity coefficient (such as silver glue or aluminum nitride, etc.), and the heat dissipation structure may have a metal material. As shown in FIG. 23, a first heat conductive element 4-HE1 is disposed on the bottom of the photosensitive element 4-120 and is in direct contact with the first heat dissipation structure 4-HD1 and the photosensitive element 4-120, and the first heat conductive element 4-RE1 is electrically independent of the photosensitive element 4-120. The first heat dissipation structure 4-HD1 is connected to the first heat conductive element 4-HE1 and the base 4-102. Specifically, the first heat dissipation structure 4-HD1 penetrates the integrated package substrate 4-110, the reinforcing material 4-135, and the circuit assembly 4-103 to be connected to the base 4-102, and the first heat dissipation structure 4-HD1 is electrically independent of the integrated package substrate 4-110.

As shown in FIG. 23, a second heat dissipation structure 4-HD2 is connected to a second heat conductive element 4-HE2, the second heat dissipation structure 4-HD2 is embedded in the integrated package substrate 4-110, and the second heat dissipation structure 4-HD2 does not penetrate the integrated package substrate 4-110. A third heat dissipation structure 4-HD3 is connected to a third heat conductive element 4-HE3 and the circuit assembly 4-103, and the third heat dissipation structure 4-HD3 does not penetrate the circuit assembly 4-103. In addition, a fourth heat dissipation structure 4-HD4 is embedded in the circuit assembly 4-103, and based on the configuration of the insulating structure layer 4-1030, the fourth heat dissipation structure 4-HD4 is electrically independent of the circuit wires 4-1031.

Based on the configuration of above-mentioned heat dissipation structures and the heat conductive element, the heat dissipation efficiency of the photosensitive element 4-120 can be improved, so that the stability of the digital image signal generated by the photosensitive element 4-120 can also be improved.

It is worth noting that the above heat dissipation structures are electrically independent of the circuit wires 4-1031. In addition, in some embodiments, the heat conductive elements can be omitted, which means that the photosensitive element 4-120 can be connected to the base 4-102 through the first heat dissipation structure 4-HD1. Furthermore, the integrated package substrate 4-110 is connected to the base 4-102 through the first heat dissipation structure 4-HD1 as well.

Figure 24:
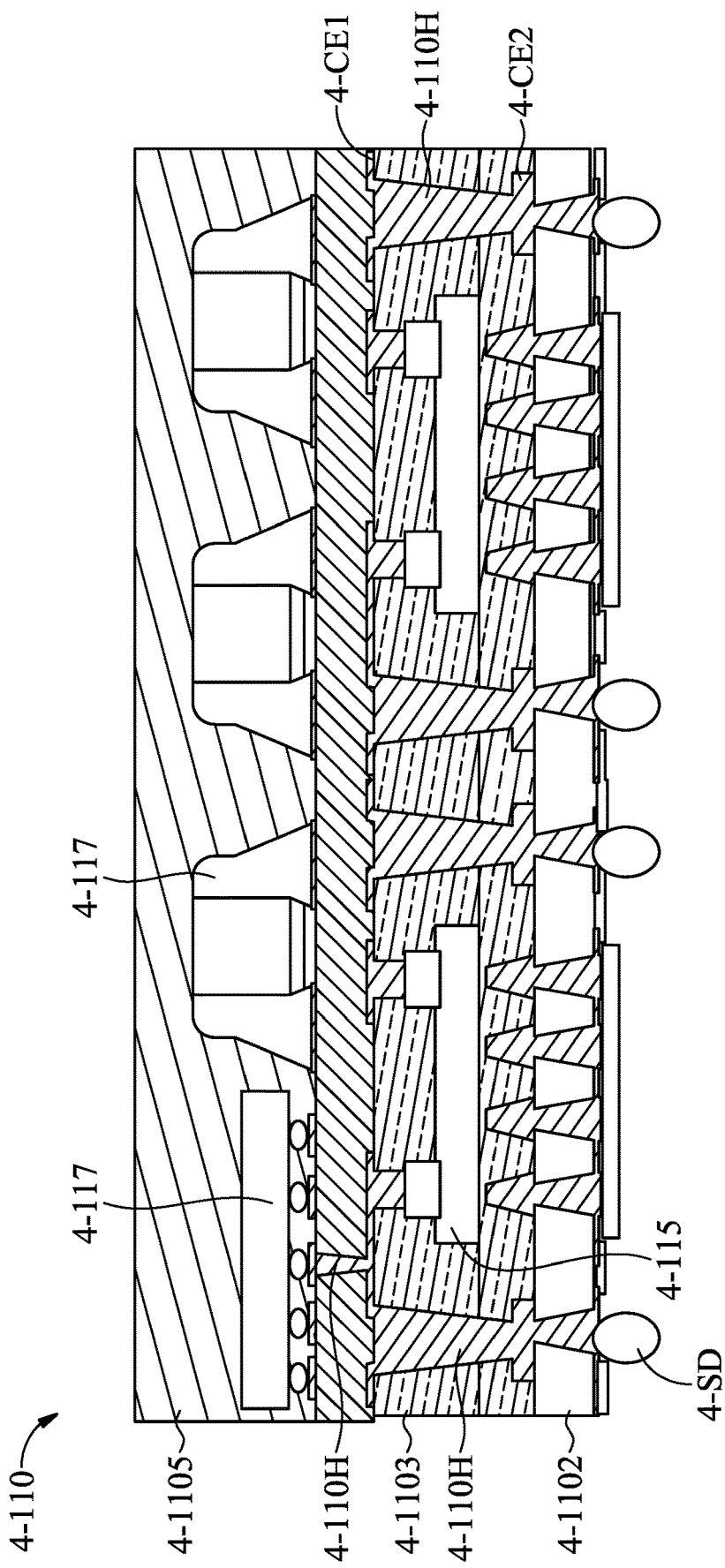
FIG. 24 is an enlarged structural diagram of the integrated package substrate 4-110 according to some embodiments of the present disclosure.

Next, please refer to FIG. 24, which is an enlarged structural diagram of the integrated package substrate 4-110 according to some embodiments of the present disclosure. In this embodiment, the integrated package substrate 4-110 includes a third insulating layer 4-1101, a fourth insulating layer 4-1102, an intermediate layer 4-1103, a first circuit element 4-CE1, and a second circuit element 4-CE2.

The intermediate layer 4-1103 is disposed between the third insulating layer 4-1101 and the fourth insulating layer 4-1102, and the first electronic component 4-115 is disposed in the intermediate layer 4-1103. The first circuit element 4-CE1 is disposed between the third insulating layer 4-1101 and the intermediate layer 4-1103, the second circuit element 4-CE2 is disposed between the intermediate layer 4-1103 and the fourth insulating layer 4-1102, and the intermediate layer 4-1103 is made of a material different from that of the third insulating layer 4-1101 or the fourth insulating layer 4-1102. For example, the material of the intermediate layer 4-1103 is softer than the materials of the third insulating layer 4-1101 and the fourth insulating layer 4-1102

The first circuit element 4-CE1 and the second circuit element 4-CE2 may be metal pads, which are connected to each other by the through hole 4-110H. In addition, a plurality of electronic units 4-117 (such as integrated circuit wafers) may be disposed on the third insulating layer 4-1101, and the integrated package substrate 4-110 further includes a packaging layer 4-1105 to cover the electronic units 4-117 to prevent them from exposure. The electronic units 4-117 may be electrically connected to the solder 4-SD through the plurality of through holes 4-110H, the first circuit element 4-CE1 and the second circuit element 4-CE2.

Please return to FIG. 23 again. In this embodiment, the photosensitive module 4-100 further includes a second electronic component 4-155 disposed on a surface 4-110S of the integrated package substrate 4-110. It is worth noting that the second electronic component 4-155 and the photosensitive element 4-120 are disposed on the same side of the integrated package substrate 4-110.

Figure 25:
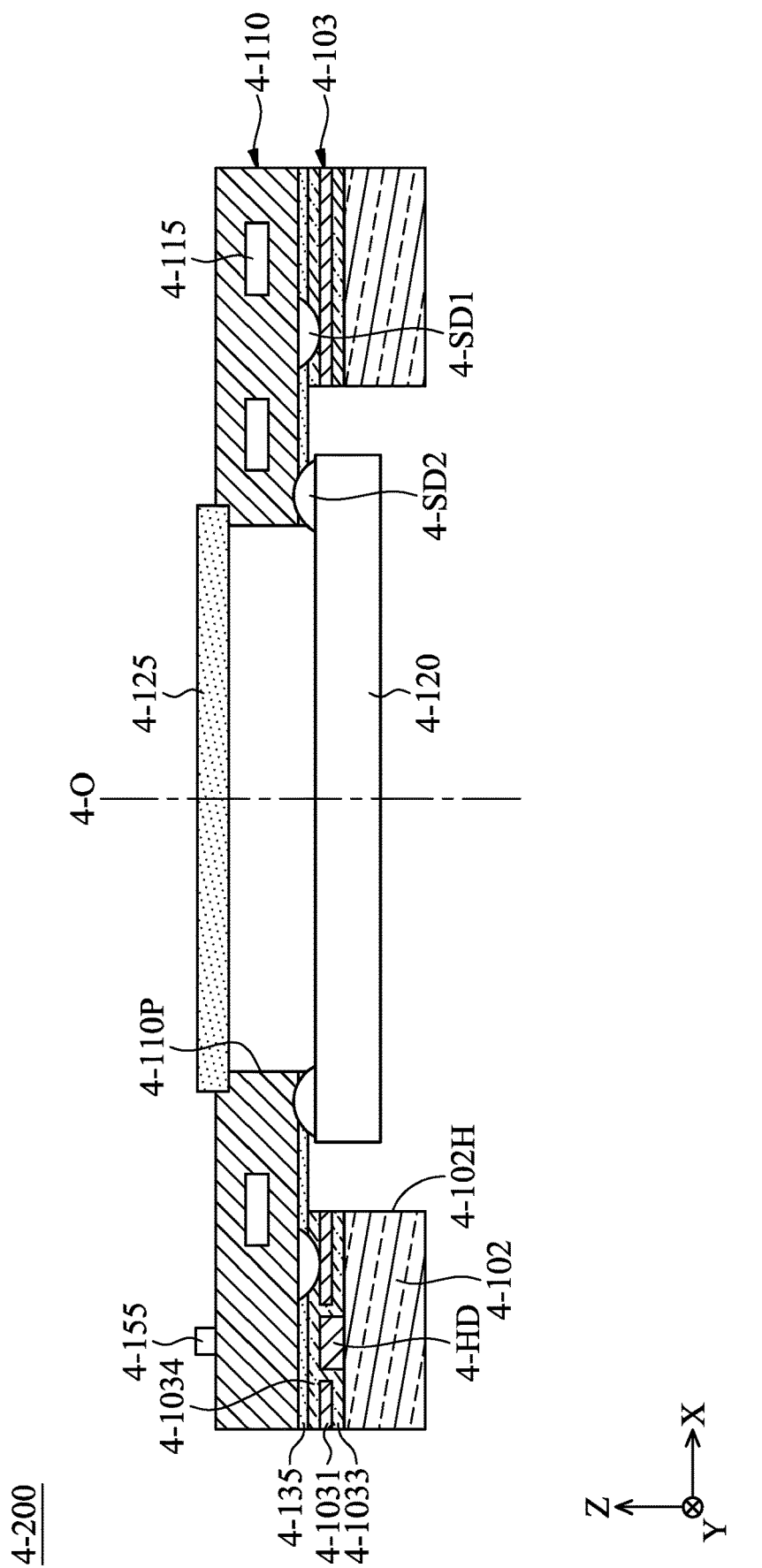
FIG. 25 is a schematic cross-sectional structure diagram of a photosensitive module 4-200 according to another embodiment of the present disclosure.

Please refer to FIG. 25, which is a schematic cross-sectional structural diagram of a photosensitive module 4-200 according to another embodiment of the present disclosure. In this embodiment, the base 4-102 has an opening 4-102H corresponding to the photosensitive element 4-120. Specifically, the photosensitive element 4-120 is disposed in the opening 4-102H. When viewed along the direction perpendicular to the optical axis 4-O (for example, the X-axis), the photosensitive element 4-120 overlaps at least a portion of the base 4-102.

The photosensitive module 4-200 includes a plurality of first electrical connection portions 4-SD1 and a plurality of second electrical connection portions 4-SD2, and the first electrical connection portion 4-SD1 and the second electrical connection portion 4-SD2 may be solder. The integrated package substrate 4-110 is electrically connected to the circuit assembly 4-103 via the first electrical connection portions 4-SD1, which means that the integrated package substrate 4-110 is connected to the base 4-102 via the circuit assembly 4-103. The photosensitive element 4-120 is electrically connected to the integrated package substrate 4-110 via the second electrical connection portions 4-SD2, and the first electrical connection portions 4-SD1 and the second electrical connection portions 4-SD2 are disposed on the same side surface (such as the bottom surface) of the integrated package substrate 4-110.

The integrated package substrate 4-110 has a through hole 4-110P corresponding to the photosensitive element 4-120, so that external light can enter the photosensitive element 4-120 through the through hole 4-110P. The transparent element 4-125 covers the through hole 4-110P to prevent dust or particles from falling onto the photosensitive element 4-120.

In this embodiment, the reinforcing material 4-135 is in direct contact with the first electrical connection portions 4-SD1, the second electrical connection portions 4-SD2 and the integrated package substrate 4-110. In addition, the second electronic component 4-155 and the photosensitive element 4-120 are respectively disposed on different sides (opposite sides) of the integrated package substrate 4-110, and the integrated package substrate 4-110 has a polyhedral structure. In addition, at least one heat dissipation structure 4-HD is disposed in the circuit assembly 4-103 to increase the heat dissipation efficiency of the photosensitive module 4-200.

Based on the above configuration, the size of the photosensitive module 4-200 in the Z-axis can be reduced to achieve the purpose of miniaturization.

Figure 26:
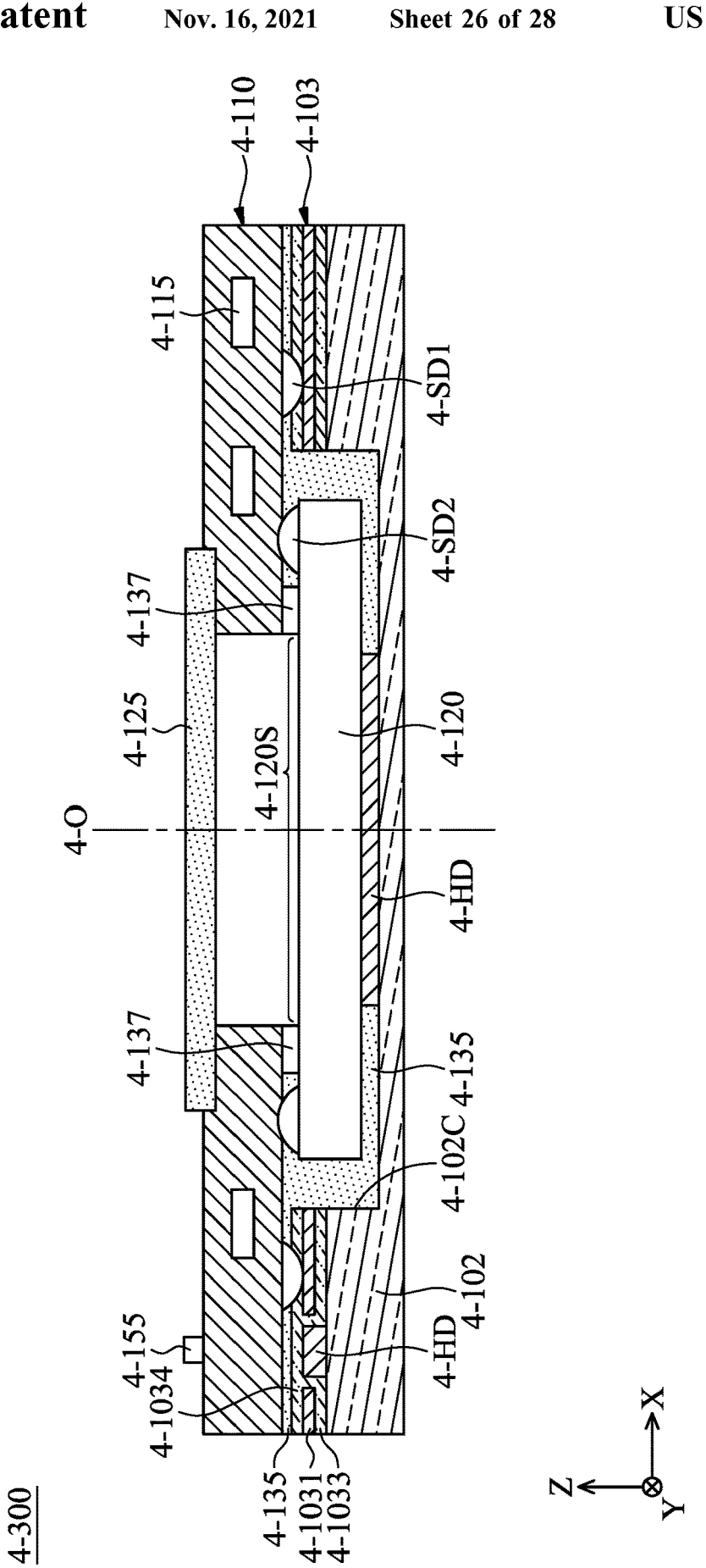
FIG. 26 is a schematic cross-sectional structure diagram of a photosensitive module 4-300 according to another embodiment of the present disclosure.

Please refer to FIG. 26, which is a schematic cross-sectional structural diagram of a photosensitive module 4-300 according to another embodiment of the present disclosure. The photosensitive module 4-300 is similar to the photosensitive module 4-200, and in this embodiment, a recess 4-102C is formed on the base 4-102 for accommodating the photosensitive element 4-120. Similarly, the photosensitive element 4-120 is electrically connected to the integrated package substrate 4-110 via the second electrical connection portions 4-SD2, so that the photosensitive element 4-120 is suspended in the recess 4-102C.

In this embodiment, the photosensitive module 4-300 further includes two blocking walls 4-137, which are disposed between the photosensitive element 4-120 and the integrated package substrate 4-110, and the blocking walls 4-137 can prevent foreign objects from entering a photosensitive area 4-120S of the photosensitive element 4-120. The range of the photosensitive area 4-120S in the X-axis is substantially equal to the distance between the two blocking walls 4-137 in the X-axis.

Furthermore, the photosensitive module 4-300 also includes at least one heat dissipation structure 4-HD and the reinforcing material 4-135. The heat dissipation structure 4-HD in the middle is connected between the photosensitive element 4-120 and the base 4-102, and the reinforcing material 4-135 is in direct contact with the blocking walls 4-137, the first electrical connection portions 4-SD1, the second electrical connection portion 4-SD2, the integrated package substrate 4-110, the base 4-102, the heat dissipation structure 4-HD and the photosensitive element 4-120. The reinforcing material 4-135 can protect the photosensitive element 4-120 and improve the heat dissipation efficiency of the photosensitive module 4-300.

Figure 27:
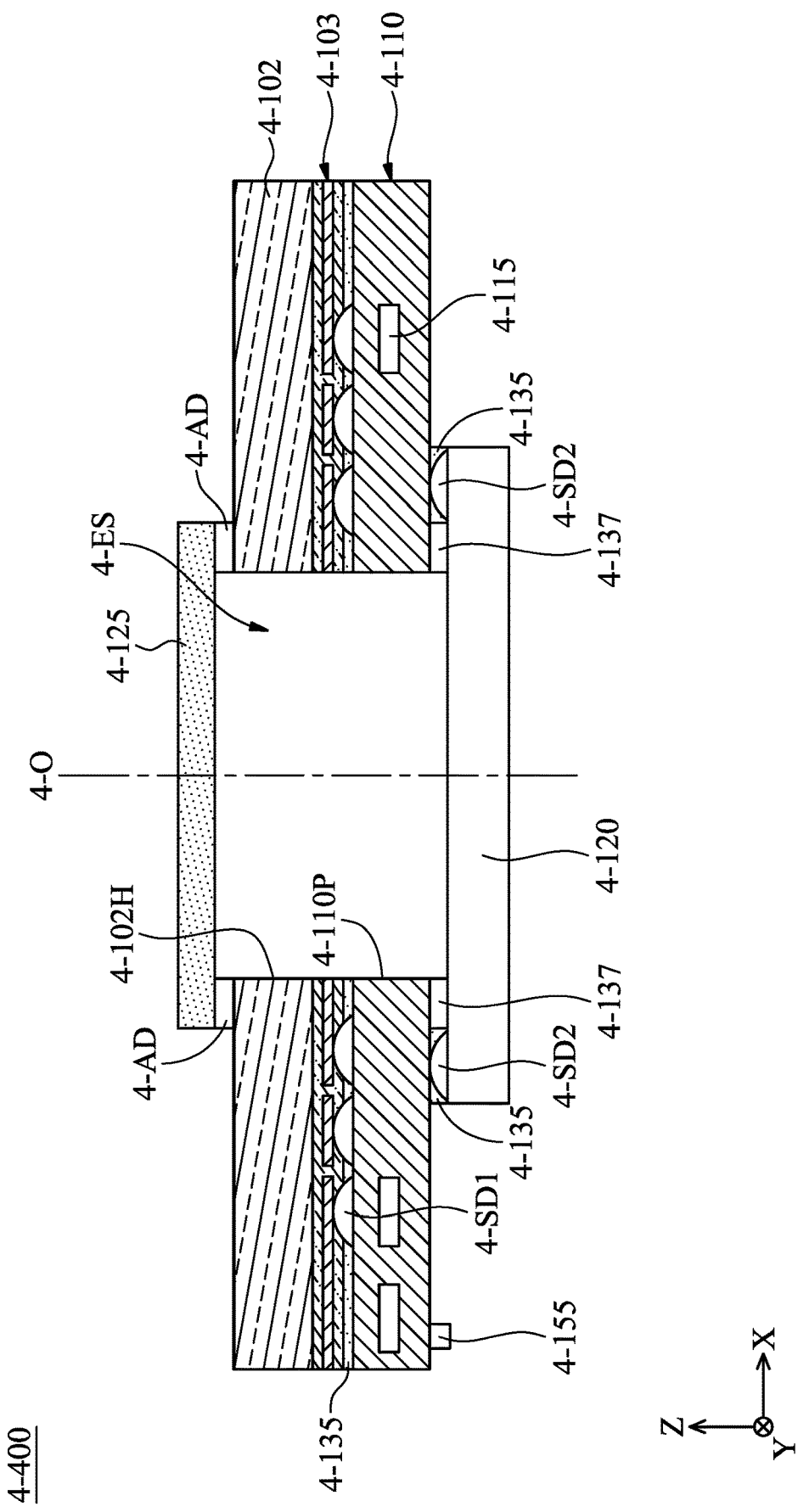
FIG. 27 is a schematic cross-sectional structure diagram of a photosensitive module 4-400 according to another embodiment of the present disclosure.

Please refer to FIG. 27, which is a schematic cross-sectional structural diagram of a photosensitive module 4-400 according to another embodiment of the present disclosure. In this embodiment, the circuit assembly 4-103 is disposed between the base 4-102 and the integrated package substrate 4-110, and the integrated package substrate 4-110 is electrically connected to the circuit assembly 4-103 through the first electrical connection portions 4-SD1. The photosensitive element 4-120 is disposed on the bottom of the integrated package substrate 4-110, the photosensitive element 4-120 is electrically connected to the integrated package substrate 4-110 via the second electrical connection portions 4-SD2, and the first electrical connection portions 4-SD1 and the second electrical connection portions 4-SD2 are respectively disposed on different sides of the integrated package substrate 4-110 which has a polyhedral structure.

The transparent element 4-125 corresponds to the photosensitive element 4-120, and the transparent element 4-125 is fixed on the base 4-102 by the adhesive element 4-AD. When viewed in a direction perpendicular to the optical axis 4-O, the base 4-102 is located between the transparent element 4-125 and the photosensitive element 4-120.

In this embodiment, the through hole 4-110P of the integrated package substrate 4-110 and the opening 4-102H of the base 4-102 may have the same size, for example, the same aperture in the X-axis to form an enclosed space 4-ES. The enclosed space 4-ES is light-transmissive and can be defined by the transparent element 4-125, the base 4-102, the integrated package substrate 4-110 and the photosensitive element 4-120. Light can enter the enclosed space 4-ES along the optical axis 4-O and then be received by the photosensitive element 4-120.

It is worth noting that the left and right sides of the base 4-102 in this embodiment may further include movable cantilevers (not shown in the figure), such as the movable cantilever 1-1143 in FIG. 2, so that the photosensitive element 4-120 is suspended at a circuit board (such as 1-120 in FIG. 2). Therefore, it can avoid damage caused by collision.

Figure 28:
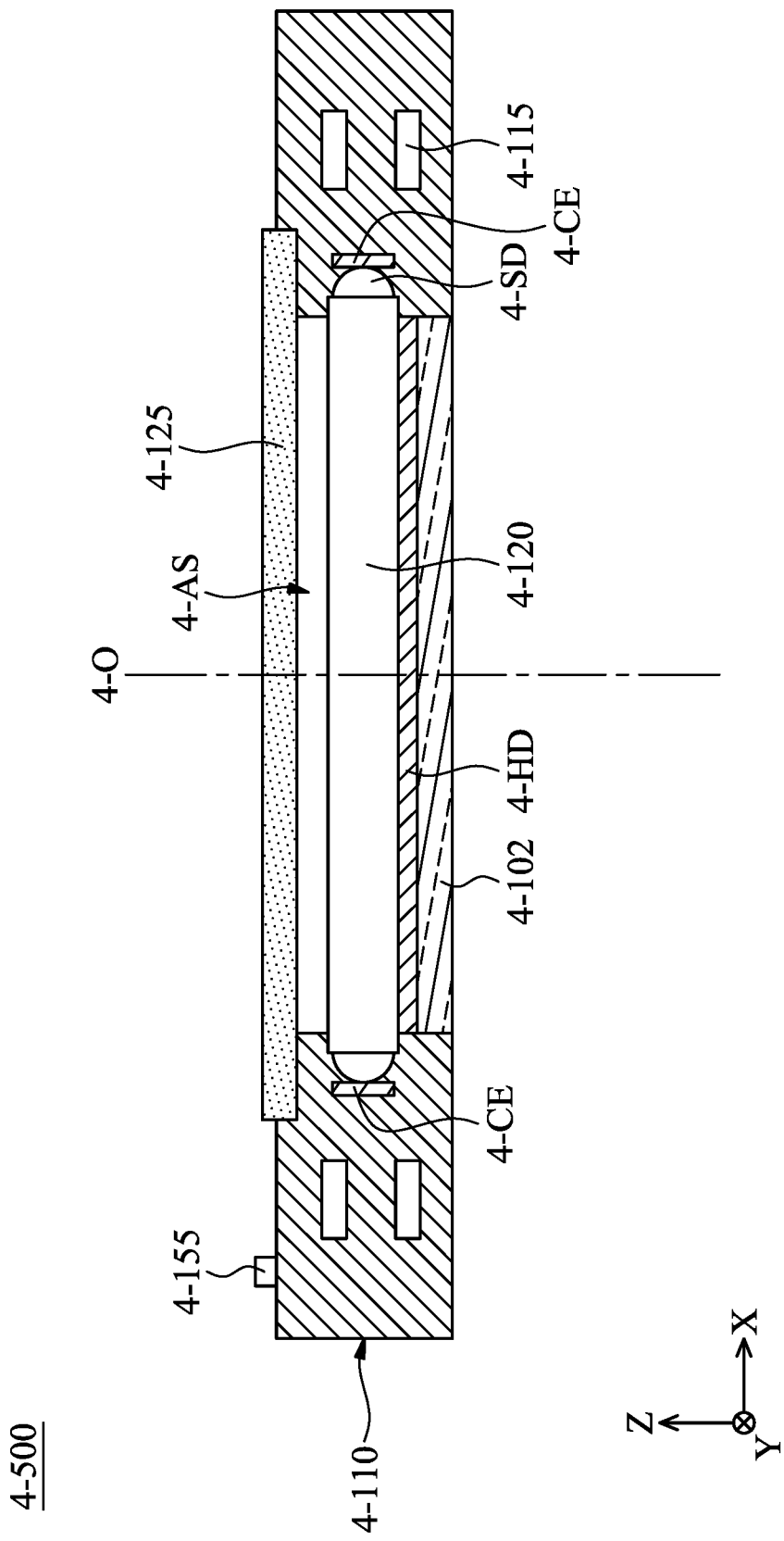
FIG. 28 is a schematic cross-sectional structure diagram of a photosensitive module 4-500 according to another embodiment of the present disclosure.

Please refer to FIG. 28, which is a schematic cross-sectional structural diagram of a photosensitive module 4-500 according to another embodiment of the present disclosure. In this embodiment, the integrated package substrate 4-110 has an enclosed accommodating space 4-AS for accommodating the photosensitive element 4-120. At least a portion or all of the base 4-102 is disposed in the accommodating space 4-AS, and when viewed in the direction perpendicular to the optical axis 4-O (for example, the X-axis), the base 4-102 partially overlaps the integrated package substrate 4-110.

The photosensitive module 4-500 also includes a heat dissipation structure 4-HD disposed between the photosensitive element 4-120 and the base 4-102, and the heat dissipation structure 4-HD is in direct contact with the photosensitive element 4-120, the base 4-102 and the integrated package substrate 4-110. The photosensitive element 4-120 is electrically connected to a circuit element 4-CE (similar to the first circuit element 4-CE1 or the second circuit element 4-CE2 in FIG. 24) in the integrated package substrate 4-110 via solder 4-SD.

When viewed in the direction perpendicular to the optical axis 4-O (for example, the X-axis), the photosensitive element 4-120 overlaps at least a portion of the integrated package substrate 4-110. Furthermore, when viewed in the direction perpendicular to the optical axis 4-O (for example, the X-axis), at least a portion of the transparent element 4-125 overlaps the integrated package substrate 4-110.

Based on the above configuration, the size of the photosensitive module 4-500 in the Z-axis can be further reduced to achieve the purpose of miniaturization.

The present disclosure provides a photosensitive module that can be installed in various electronic devices. The photosensitive module may include a base 4-102, a circuit assembly 4-103, an integrated package substrate 4-110, and a photosensitive element 4-120. The photosensitive element 4-120 can be electrically connected to the circuit assembly 4-103 or the integrated package substrate 4-110. The integrated package substrate 4-110 may be a semiconductor embedded substrate (SESUB), which has a plurality of electronic components, and those electronic components are enclosed in the integrated package substrate 4-110 without being exposed to external environment. Based on the configuration of the integrated package substrate 4-110, the photosensitive module can be equipped with more electronic components and can have a smaller volume at the same time.

The base 4-102 may be made of a material with high thermal conductivity coefficient to improve the overall heat dissipation effect of the photosensitive module. Furthermore, in some embodiments, the photosensitive module may further include a plurality of heat dissipation structures connected to the photosensitive element 4-120. The configuration of the heat dissipation structure can improve the heat dissipation efficiency of the photosensitive module.

It should be noted that the features (such as structures, elements and so on) of the various embodiments can be combined and used as long as they do not violate or conflict the scope of the disclosure.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed assembly;
   a first movable assembly, movable relative to the fixed assembly and configured to be connected to a photosensitive element, wherein the photosensitive element corresponds to an optical element; and
   a first driving assembly, configured to drive the first movable assembly to move relative to the fixed assembly;
   wherein the first movable assembly includes a heat dissipation structure corresponding to the first driving assembly, the optical element or the photosensitive element;
   wherein the first movable assembly includes a substrate configured to support the photosensitive element, and a plurality of circuit elements is disposed on the substrate and is electrically connected to the photosensitive element;
   wherein the first movable assembly further includes a circuit board and a first heat conducting element, the circuit board is disposed between the photosensitive element and the substrate, and the first heat conducting element is disposed between the circuit board and the substrate;
   wherein the first movable assembly further includes a second heat conducting element disposed in the circuit board and connected to the photosensitive element and the substrate.

2. The photosensitive element driving mechanism as claimed in claim 1, wherein the first heat conducting element includes a plurality of heat-conducting particles.

3. The photosensitive element driving mechanism as claimed in claim 1, wherein the substrate is disposed between the circuit board and the optical element, and an opening corresponding to the photosensitive element is formed on the substrate.

4. The photosensitive element driving mechanism as claimed in claim 1, wherein the first driving assembly includes a plurality of first driving magnetic elements and a plurality of first driving coils which are correspondingly disposed on a plurality of sides of the substrate.

5. The photosensitive element driving mechanism as claimed in claim 4, wherein the substrate is made of a magnetically conductive material, and the substrate corresponds to the first driving magnetic elements.

6. The photosensitive element driving mechanism as claimed in claim 1, wherein the fixed assembly includes a base plate, and a gap is formed between the substrate and the base plate.

7. The photosensitive element driving mechanism as claimed in claim 6, wherein the substrate includes a plurality of movable cantilevers, extending in a direction perpendicular to a main axis of the fixed assembly.

8. The photosensitive element driving mechanism as claimed in claim 7, wherein a bottom surface of the substrate faces the base plate, and the heat dissipation structure is formed on the bottom surface.

9. The photosensitive element driving mechanism as claimed in claim 8, wherein the fixed assembly further includes a plurality of supporting elements disposed on the base plate, and the supporting elements are configured to support the substrate, so that the substrate slides in a direction perpendicular to the main axis.

10. The photosensitive element driving mechanism as claimed in claim 7, wherein each movable cantilever has a first turning portion and a second turning portion, and the first turning portion and the second turning portion are bent in different directions.

11. The photosensitive element driving mechanism as claimed in claim 10, wherein each movable cantilever has a plate-shaped structure, and the plate-shaped structure has a first thickness direction, the first turning portion is bent around a first axis, and the first axis is not parallel to the first thickness direction.

12. The photosensitive element driving mechanism as claimed in claim 11, wherein the plate-shaped structure has a second thickness direction, the second turning portion is bent around a second axis, and the second axis is parallel to the second thickness direction.

13. The photosensitive element driving mechanism as claimed in claim 12, wherein an electronic component is disposed on the base plate, each of the movable cantilevers has a third turning portion, and when viewed in a direction perpendicular to the main axis, the third turning portion partially overlaps the electronic component.

14. The photosensitive element driving mechanism as claimed in claim 7, wherein the substrate includes a main body, each of the movable cantilevers has a first end portion and a second end portion, respectively connected to the main body and the base plate, and there is a distance between the first end portion and the second end portion in the main axis.

15. The photosensitive element driving mechanism as claimed in claim 7, wherein the substrate includes a main body, each of the movable cantilevers has a first end portion and a second end portion, respectively connected to the main body and the base plate, and the first end portion and the second end portion are at a same level on the main axis.

16. The photosensitive element driving mechanism as claimed in claim 15, wherein the substrate includes two pairs of movable cantilevers disposed on two opposite sides of the main body.

17. The photosensitive element driving mechanism as claimed in claim 7, wherein an insulating element is disposed on the substrate and is continuously distributed on the movable cantilevers, and the circuit elements are disposed on the insulating element.

18. An optical element driving mechanism, comprising:
a fixed assembly;
a first movable assembly, movable relative to the fixed assembly and configured to be connected to a photosensitive element, wherein the photosensitive element corresponds to an optical element; and
a first driving assembly, configured to drive the first movable assembly to move relative to the fixed assembly;
wherein the first movable assembly includes a heat dissipation structure corresponding to the first driving assembly, the optical element or the photosensitive element;
wherein the first movable assembly includes a substrate configured to support the photosensitive element, and a plurality of circuit elements is disposed on the substrate and is electrically connected to the photosensitive element;
wherein the first driving assembly includes a plurality of first driving magnetic elements and a plurality of first driving coils which are correspondingly disposed on a plurality of sides of the substrate;
wherein the substrate is made of a magnetically conductive material, and the substrate corresponds to the first driving magnetic elements.

19. An optical element driving mechanism, comprising:
a fixed assembly;
a first movable assembly, movable relative to the fixed assembly and configured to be connected to a photosensitive element, wherein the photosensitive element corresponds to an optical element; and
a first driving assembly, configured to drive the first movable assembly to move relative to the fixed assembly;
wherein the first movable assembly includes a heat dissipation structure corresponding to the first driving assembly, the optical clement or the photosensitive element;
wherein the first movable assembly includes a substrate configured to support the photosensitive element, and a plurality of circuit elements is disposed on the substrate and is electrically connected to the photosensitive element;
wherein the fixed assembly includes a base plate, and a gap is formed between the substrate and the base plate;
wherein the substrate includes a plurality of movable cantilevers, extending in a direction perpendicular to a main axis of the fixed assembly.

* * * * *